(12) United States Patent
Kärkkäinen

(10) Patent No.: US 10,237,248 B2  
(45) Date of Patent: Mar. 19, 2019

(54) ENCODER, DECODER AND METHOD

(71) Applicant: Gurulogic Microsystems Oy, Turku (FI)

(72) Inventor: Tuomas Kärkkäinen, Turku (FI)

(73) Assignee: GURULOGIC MICROSYSTEMS OY, Turku (FI)

( * ) Notice: Subject to any disclaimer, the term of this patent is extended or adjusted under 35 U.S.C. 154(b) by 0 days.

(21) Appl. No.: 15/502,210

(22) PCT Filed: Aug. 7, 2015

(86) PCT No.: PCT/EP2015/025056  
§ 371 (c)(1),  
(2) Date: Feb. 7, 2017

(87) PCT Pub. No.: WO2016/020068  
PCT Pub. Date: Feb. 11, 2016

(65) Prior Publication Data  
US 2017/0237715 A1    Aug. 17, 2017

(30) Foreign Application Priority Data  
Aug. 7, 2014    (GB) .................... 1414007.3

(51) Int. Cl.  
*H04L 29/06*    (2006.01)  
*H04L 9/06*    (2006.01)  
(Continued)

(52) U.S. Cl.  
CPC ........ *H04L 63/0428* (2013.01); *H04L 9/0618* (2013.01); *H04L 9/0637* (2013.01);  
(Continued)

(58) Field of Classification Search  
CPC . H04L 63/0428; H04L 9/0618; H04L 9/0819; H04L 9/0637; H04L 9/0662; H04L 9/12; H04L 2209/125  
See application file for complete search history.

(56) References Cited

U.S. PATENT DOCUMENTS 6,122,379 A * 9/2000 Barbir ................. H03M 7/3084  
380/217  
7,076,064 B2   7/2006 Relander et al.  
(Continued)

FOREIGN PATENT DOCUMENTS

| EP | 1037131 A2 | 9/2000 |
| EP | 1209844 A2 | 5/2002 |
| RU | 2273894 C2 | 4/2006 |

OTHER PUBLICATIONS

International Search Report, Application No. PCT/EP2015/025056, dated Oct. 30, 2015, 2 pages.  
(Continued)

Primary Examiner — Techane Gergiso  
(74) Attorney, Agent, or Firm — Ziegler IP Law Group, LLC

(57) ABSTRACT

A method of encoding and encrypting input data (D1) to generate corresponding encoded and encrypted data (E2) is provided. At least a first data block of the input data (D1) is encoded to generate a first encoded data block. The at least first encoded data block is then encrypted using at least one key to provide a first encoded and encrypted data block for inclusion in the encoded and encrypted data (E2). Moreover, a first seed value is generated for use in encrypting a next encoded data block to provide a next encoded and encrypted data block for inclusion in the encoded and encrypted data (E2). Furthermore, a next seed value is generated for use in encrypting a subsequent encoded data block, in a sequential repetitive manner until each data block of the input data (D1)  
(Continued)

is encoded and encrypted into the encoded and encrypted data (E2).

23 Claims, 5 Drawing Sheets

(51) Int. Cl.
*H04L 9/12* (2006.01)
*H04L 9/08* (2006.01)

(52) U.S. Cl.
CPC .......... *H04L 9/0662* (2013.01); *H04L 9/0819* (2013.01); *H04L 9/12* (2013.01); *H04L 2209/125* (2013.01)

(56) References Cited

U.S. PATENT DOCUMENTS

| | | | |
|---|---|---|---|
| 8,660,261 B2 | 2/2014 | Chang et al. | |
| 9,496,897 B1* | 11/2016 | Triandopoulos | H03M 13/63 |
| 2002/0066012 A1 | 5/2002 | Relander | |
| 2003/0016826 A1* | 1/2003 | Asano | G11B 20/00086 |
| | | | 380/277 |
| 2003/0095664 A1* | 5/2003 | Asano | G11B 20/00086 |
| | | | 380/277 |
| 2004/0148501 A1* | 7/2004 | Livaditis | H04N 7/162 |
| | | | 713/161 |
| 2004/0165722 A1* | 8/2004 | Van Rijnsoever | H04L 9/12 |
| | | | 380/43 |
| 2005/0232424 A1* | 10/2005 | Dobranski | H04K 1/02 |
| | | | 380/270 |
| 2006/0018465 A1* | 1/2006 | Saeki | H04N 7/1675 |
| | | | 380/44 |
| 2006/0056625 A1 | 3/2006 | Nakabayashi et al. | |
| 2006/0150251 A1* | 7/2006 | Takashima | G11B 20/00086 |
| | | | 726/26 |
| 2006/0188095 A1 | 8/2006 | Jung et al. | |
| 2007/0211891 A1* | 9/2007 | Shamoon | H04L 63/0428 |
| | | | 380/28 |
| 2009/0276803 A1* | 11/2009 | Weaver | H04N 7/17318 |
| | | | 725/32 |
| 2010/0067704 A1* | 3/2010 | Hauge | G06F 21/10 |
| | | | 380/284 |
| 2011/0225417 A1* | 9/2011 | Maharajh | G06F 21/10 |
| | | | 713/150 |
| 2012/0011351 A1* | 1/2012 | Mundra | G06F 21/72 |
| | | | 713/1 |
| 2012/0250863 A1* | 10/2012 | Bukshpun | H04L 9/0838 |
| | | | 380/278 |
| 2014/0056068 A1* | 2/2014 | Strasser | G06F 11/1048 |
| | | | 365/185.03 |

OTHER PUBLICATIONS

Patent Office of the Russian Federation, Decision to Grant Patent for an Invention, Application No. 201710534008, dated Aug. 24, 2017, 2 pages.
Notice of Allowance of Patent, Application No. KR 10-2017-7006321, dated Apr. 6, 2017, 1 page (Only the English translation).
International Preliminary Report, Application No. PCT/EP2015/025056, dated Nov. 10, 2016, 22 pages.
M.I. Samarakoon et al. "Encrypted Video over Tetra", Feb. 10, 2000, Printed and Published by the IEE, Savoy Place, London WC2R OBL, UK, 5 pages.

* cited by examiner

ENCODER, DECODER AND METHOD

TECHNICAL FIELD

The present disclosure relates to encoders for encoding and encrypting input data (D1) to generate corresponding encoded and encrypted data (E2), and corresponding methods of encoding and encrypting input data (D1) to generate corresponding encoded and encrypted data (E2). Moreover, the present disclosure relates to decoders for decrypting and decoding encoded and encrypted data (E2) to generate corresponding decoded data (D3), and corresponding methods of decrypting and decoding encoded and encrypted data (E2) to generate corresponding decoded data (D3). Furthermore, the present disclosure is concerned with computer program products comprising a non-transitory computer-readable storage medium having computer-readable instructions stored thereon, the computer-readable instructions being executable by a computerized device comprising processing hardware to execute aforesaid methods. Additionally, the present disclosure concerns codecs including at least one aforementioned encoder and at least one aforementioned decoder.

BACKGROUND

In general, the term "encryption" refers to a process of encoding messages or information in such a way that only authorized parties can read the messages or information. A field of science that deals with encryption is called cryptography. Information has been encrypted throughout history, and it is well known that each encryption algorithm has its own associated weaknesses. Cryptanalysis, which is a branch of cryptology, is used to find weaknesses in encryption algorithms.

Encryption algorithms can be categorized into symmetric algorithms (namely, symmetric-key algorithms) and asymmetric algorithms (namely, asymmetric-key algorithms). The symmetric and asymmetric algorithms mutually differ in a way in which an encryption key is used and processed. Symmetric encryption algorithms use a shared common key to encrypt data at a transmitting end and to decrypt encrypted data at a corresponding receiving end. On the other hand, asymmetric encryption algorithms use two different keys, one of which is a public key used to encrypt data and the other is a private key used to decrypt encrypted data. Only the public key is shared between parties.

Moreover, there are one-way message digest functions, namely hash functions, which are not data encryption techniques as such, because data they represent are difficult or impossible to recover. However, one-way message digest functions are used to verify an authenticity of data and passwords, and also are used to generate encryption keys for encryption algorithms.

It is well-known that data encryption is a technically demanding operation that requires a lot of computing resources. Therefore, in order to save on computing resources and to reduce computing time, a hybrid combination of asymmetric and symmetric encryption algorithms is often used. This provides a sufficiently strong protection, such that unauthorized third-party decryption cannot be executed in real time with current computing resources. Such a kind of approach is commonly used in various different data transfer protocols, for example, such as Secure Sockets Layer (SSL)/Transport Layer Security (TLS) and Secure Shell (SSH), and in applications to sign and encrypt e-mail messages, for example, such as Pretty Good Privacy (PGP).

It has been established that cryptology, namely the scientific study of cryptography and cryptanalysis, is a continuously developing field of science that, with means of cryptanalysis, attempts to find weaknesses in encryption algorithms. For this reason, it is essential to be able to protect information maximally, but correspondingly there is a need to make compromises regarding use of computing resources used to implement the encryption. Moreover, the computing resources available are usually limited, especially in mobile devices which do their utmost to save battery power.

In a United States patent document US2006/0188095A1 (Jung et al.; "Combination encoding method for simultaneous encrypting and channel encoding, transmitting apparatus thereof, combination decoding method for simultaneous channel decoding and decrypting, and receiving apparatus thereof"; assigned to Samsung Electronics Co. Ltd.), there is described a combination encoding method, a transmitting apparatus thereof, a combination decoding method, and a receiving apparatus thereof. The transmitting apparatus includes a combination encoding unit for performing combination encoding on a source coded message and outputting the combination encoded message, thereby performing encrypting and channel encoding simultaneously. The receiving apparatus includes a combination decoding unit for performing combination decoding on a noise-added combination encoded message from a demodulator, and outputting a source coded message, thereby simultaneously performing channel decoding and decrypting on the noise-added combination encoded message.

In a United States patent document U.S. Pat. No. 8,660,261B2 (Chang et al.; "System and apparatus for integrated video/image encoding/decoding and encryption/decryption", assigned to Mediatek Singapore Pte. Ltd.), there is described an encryption-enabled entropy coder for a multimedia codec. The entropy coder implements a randomized Huffman coding scheme without storing multiple sets of Huffman tables in a read-only memory (ROM). The entropy coder includes a ROM storing a single set of code tables, a table lookup section coupled to the ROM which converts symbols to original code-words and vice versa by performing table lookup, and a table randomizer section for converting original Huffman code-words to randomized Huffman code words and vice versa, using an isomorphic code generator algorithm. The table randomizer section performs the conversion based upon a key hopping sequence generated by a pseudorandom bit generator using an encryption/decryption key.

In a United States patent document US2006/0056625A1 (Sumie et al.; "Encryption method, encryption apparatus, data storage distribution apparatus and data delivery system", assigned to Hitachi Kokusai Electric, Inc.), there is described an encryption method for encrypting data to be encrypted by using a random number sequence generated by a random number generating unit for generating the random number sequence uniquely decided from an input parameter, comprising the step of: generating the input parameter based on metadata of the data to be encrypted. In a published article (Samarakoon et al.; "*Encrypted video over TETRA*"), there is described a mobile communications system with enhanced security. The system uses end to end encryption in addition to air interference encryption. The system uses a frame insertion technique to provide synchronization for end to end encryption. The frame insertion technique inserts synchronisation frames to a transmitted video stream between successive video frames to avoid data loss. However, to permit insertion the application has to reduce the data rate to maintain the same overall transmission rate.

SUMMARY

The present disclosure seeks to provide an encoder for encoding and encrypting input data (D1) to generate corresponding encoded and encrypted data (E2).

Moreover, the present disclosure seeks to provide a decoder for decrypting and decoding encoded and encrypted data (E2) to generate corresponding decoded data (D3).

In a first aspect, embodiments of the present disclosure provide an encoder for encoding and encrypting input data (D1) including a plurality of data blocks or data packets or data streams, wherein the encoder includes a data processing arrangement for processing the input data (D1) to generate corresponding encoded and encrypted data (E2), characterized in that the data processing arrangement integrates encoding and encrypting processes for generating the encoded and encrypted data (E2), wherein:
(i) the data processing arrangement is operable to encode at least a first data block or data packet or data stream of the plurality of data blocks or data packets or data streams to generate a first encoded data block or data packet or data stream, and to encrypt the at least a first encoded data block or data packet or data stream using at least one key to provide a first encoded and encrypted data block or data packet or data stream for inclusion in the encoded and encrypted data (E2);
(ii) the data processing arrangement is operable to generate a first seed value for use in encrypting a next encoded data block or data packet or data stream to provide a next encoded and encrypted data block or data packet or data stream for inclusion in the encoded and encrypted data (E2); and
(iii) the data processing arrangement is operable to generate a next seed value for use in encrypting a subsequent encoded data block or data packet or data stream in a sequential repetitive manner until the plurality of data blocks or data packets or data streams are encoded and encrypted into the encoded and encrypted data (E2),
wherein for a given data block or data packet or data stream to be encoded and encrypted, a seed value is generated based on its previous data block or data packet or data stream.

The invention is of advantage is that it is capable of providing an improved form of encoder for encoding data to generate corresponding encoded data by way of use of seed values.

Moreover, optionally, the data processing arrangement is operable to encode and encrypt the input data (D1) to generate the corresponding encoded and encrypted data (E2) in the sequential repetitive manner by branching to a plurality of concurrent sequences of encoding and encrypting of data blocks or data packets or data streams using associated seed values.

Optionally, the data processing arrangement of the encoder is implemented by employing at least one Reduced Instruction Set Computing (RISC) processor that is operable to execute program instructions as will be elucidated in detail later.

Optionally, the data processing arrangement of the encoder is operable to encode and encrypt the input data (D1) provided in a form of at least one of: one-dimensional data, multi-dimensional data, text data, binary data, sensor data, audio data, image data, video data, but not limited thereto.

Optionally, the data processing arrangement of the encoder is supplied in operation with the at least one key for use in generating the encoded and encrypted data (E2).

Optionally, the data processing arrangement of the encoder is operable to use the at least one key repetitively in combination with the seed values for encrypting encoded data blocks or data packets or data streams for inclusion in the encoded and encrypted data (E2). Alternatively, optionally, the data processing arrangement of the encoder is operable to use the at least one key for encrypting the first encoded data block and/or data packet alone.

Moreover, optionally, the data processing arrangement of the encoder is operable to employ an initialization vector (IV) in combination with the at least one key for encrypting the first encoded data block or data packet or data stream.

Moreover, optionally, the data processing arrangement is operable to include in the encoded and encrypted data (E2) information indicative of at least one algorithm employed for generating seed values for use in encrypting encoded data blocks or data packets or data streams.

Moreover, optionally, the data processing arrangement of the encoder is operable to arrange for delivery of the at least one key, for use in subsequent decrypting and decoding of the encoded and encrypted data (E2), manually or via an encrypted e-mail or via an encrypted communication connection. Optionally, the encrypted communication connection is implemented via Secure Sockets Layer (SSL)/Transport Layer Security (TLS) protocol.

In a second aspect, embodiments of the present disclosure provide a method of encoding and encrypting input data (D1) including a plurality of data blocks or data packets or data streams, via an encoder, wherein the encoder includes a data processing arrangement for processing the input data (D1) to generate corresponding encoded and encrypted data (E2), characterized in that the data processing arrangement integrates encoding and encrypting processes for generating the encoded and encrypted data (E2), and wherein the method includes:
(i) encoding a first data block or data packet or data stream of the plurality of data blocks or data packets or data streams to generate at least a first encoded data block or data packet or data stream;
(ii) encrypting the at least a first encoded data block or data packet or data stream using at least one key to provide a first encoded and encrypted data block or data packet or data stream for inclusion in the encoded and encrypted data (E2);
(iii) generating a first seed value for use in encrypting a next encoded data block or data packet or data stream to provide a next encoded and encrypted data block or data packet or data stream for inclusion in the encoded and encrypted data (E2); and
(iv) generating a next seed value for use in encrypting a subsequent encoded data block or data packet or data stream, in a sequential repetitive manner until the plurality of data blocks or data packets or data streams are encoded and encrypted into the encoded and encrypted data (E2),
wherein for a given data block or data packet or data stream to be encoded and encrypted, a seed value is generated based on its previous data block or data packet or data stream.

Optionally, the method includes supplying the data processing arrangement with the at least one key for use in generating the encoded and encrypted data (E2).

Optionally, the method includes operating the data processing arrangement to use the at least one key repetitively in combination with seed values for encrypting encoded data blocks or data packets or data streams for inclusion in the encoded and encrypted data (E2).

Optionally, the method includes operating the data processing arrangement to use the at least one key for encrypting the at least a first encoded data block or data packet or data stream alone.

Optionally, the method includes operating the data processing arrangement to employ an initialization vector (IV) in combination with the at least one key when encrypting the first encoded data block or data packet or data stream.

Optionally, the method includes operating the data processing arrangement to include in the encoded and encrypted data (E2) information indicative of at least one algorithm employed for generating seed values for use in encrypting encoded data blocks or data packets or data streams.

Optionally, the method includes operating the data processing arrangement to encode and encrypt the input data (D1) to generate the corresponding encoded and encrypted data (E2) in the sequential repetitive manner by branching to a plurality of concurrent sequences of encoding and encrypting of data blocks or data packets or data streams using associated seed values.

Optionally, the method includes operating the data processing arrangement to encode and encrypt the input data (D1) provided in a form of at least one of: one-dimensional data, multi-dimensional data, text data, binary data, sensor data, audio data, image data, video data.

Optionally, the method includes operating the data processing arrangement to arrange for delivery of the at least one key from the encoder, for use in subsequent decrypting and decoding of the encoded and encrypted data (E2), manually or via an encrypted e-mail or via an encrypted communication connection. More optionally, the method includes implementing the encrypted communication connection via Secure Sockets Layer (SSL)/Transport Layer Security (TLS) protocol.

Optionally, the method includes implementing the data processing arrangement by employing at least one Reduced Instruction Set Computing (RISC) processor that is operable to execute program instructions.

In a third aspect, embodiments of the present disclosure provide a computer program product comprising a non-transitory (namely non-transient) computer-readable storage medium having computer-readable instructions stored thereon, the computer-readable instructions being executable by a computerized device comprising processing hardware to execute the aforementioned method.

In a fourth aspect, embodiments of the present disclosure provide a decoder for decrypting and decoding encoded and encrypted data (E2) including a plurality of encoded and encrypted data blocks or data packets or data streams, wherein the decoder includes a data processing arrangement for processing the encoded and encrypted data (E2) to generate corresponding decoded data (D3), and wherein the decoder is supplied in operation with at least one key for use in generating the decoded data (D3), characterized in that the data processing arrangement integrates decoding and decrypting processes for generating the decoded data (D3), wherein:

(i) the data processing arrangement is operable to decrypt at least a first encoded and encrypted data block or data packet or data stream of the plurality of encoded and encrypted data blocks or data packets or data streams using the at least one key to generate at least a first encoded data block or data packet or data stream, and to decode the at least first encoded data block or data packet or data stream to provide at least a first decoded data block or data packet or data stream for inclusion in the decoded data (D3);

(ii) the data processing arrangement is operable to generate a first seed value for use in decrypting a next encoded and encrypted data block or data packet or data stream of the plurality of encoded and encrypted data blocks or data packets or data streams to generate a next encoded data block or data packet or data stream, and to decode the next encoded data block or data packet or data stream to provide a next decoded data block or data packet or data stream for inclusion in the decoded data (D3); and (iii) the data processing arrangement is operable to generate a next seed value for use in decrypting and decoding a subsequent encoded and encrypted data block or data packet or data stream of the plurality of encoded and encrypted data blocks or data packets or data streams, in a sequential repetitive manner until the plurality of encoded and encrypted data blocks or data packets or data streams are decrypted and decoded into the decoded data (D3), wherein for a given encoded and encrypted data block or data packet or data stream to be decrypted and decoded, a seed value is generated based on its previous decoded data block or data packet or data stream.

Moreover, optionally, the data processing arrangement is operable to decrypt and decode the encoded and encrypted data (E2) to generate the corresponding decoded data (D3) in the sequential repetitive manner by branching to a plurality of concurrent sequences of decrypting and decoding of encoded and encrypted data blocks or data packets or data streams using associated seed values.

Optionally, the data processing arrangement of the decoder is implemented by employing at least one RISC processor that is operable to execute program instructions as will be elucidated in detail later; such a RISC processor is capable of performing relatively simpler concatenated operations at a very great speed, and suitable for encoding and decoding data provided in a streamed format, for example in real-time.

Optionally, the data processing arrangement of the decoder is operable to decrypt and decode the encoded and encrypted data (E2) provided in a form of at least one of: encoded and encrypted one-dimensional data, encoded and encrypted multi-dimensional data, encoded and encrypted text data, encoded and encrypted binary data, encoded and encrypted sensor data, encoded and encrypted audio data, encoded and encrypted image data, encoded and encrypted video data, but not limited thereto.

Optionally, the data processing arrangement of the decoder is supplied in operation with the at least one key for use in generating the decoded data (D3).

Optionally, the data processing arrangement is operable to use the at least one key repetitively in combination with the seed values for decrypting the plurality of encoded and encrypted data blocks or data packets or data streams. Alternatively, optionally, the data processing arrangement is operable to use the at least one key for decrypting the first encoded and encrypted data block or data packet or data stream alone.

Moreover, optionally, the data processing arrangement is operable to employ an initialization vector (IV) in combination with the at least one key for decrypting the first encoded and encrypted data block or data packet or data stream.

Optionally, the data processing arrangement is operable to arrange for receiving the at least one key at the decoder, for use in subsequent decrypting and decoding of the encoded and encrypted data (E2), manually or via an encrypted e-mail or via an encrypted communication connection. More optionally, the encrypted communication connection is implemented via Secure Sockets Layer (SSL)/Transport Layer Security (TLS) protocol.

In a fifth aspect, embodiments of the present disclosure provide a method of decrypting and decoding encoded and encrypted data (E2) including a plurality of encoded and encrypted data blocks or data packets or data streams, via a decoder, wherein the decoder includes a data processing arrangement for processing the encoded and encrypted data (E2) to generate corresponding decoded data (D3), and wherein the decoder is supplied in operation with at least one key for use in generating the decoded data (D3), characterized in that that the data processing arrangement integrates decoding and decrypting processes for generating the decoded data (D3), wherein the method includes:

(i) decrypting at least a first encoded and encrypted data block or data packet or data stream of the plurality of encoded and encrypted data blocks or data packets or data streams using the at least one key to generate at least a first encoded data block or data packet or data stream;

(ii) decoding the at least first encoded data block or data packet or data stream to provide at least a first decoded data block or data packet or data stream for inclusion in the decoded data (D3);

(iii) generating a first seed value for use in decrypting and decoding a next encoded and encrypted data block or data packet or data stream of the plurality of encoded and encrypted data blocks or data packets or data streams to provide a next decoded data block or data packet or data stream for inclusion in the decoded data (D3); and (iv) generating a next seed value for use in decrypting and decoding a subsequent encoded and encrypted data block or data packet or data stream of the plurality of encoded and encrypted data blocks or data packets or data streams, in a sequential repetitive manner until the plurality of encoded and encrypted data blocks or data packets or data streams are decrypted and decoded into the decoded data (D3), wherein for a given encoded and encrypted data block or data packet or data stream to be decrypted and decoded, a seed value is generated based on its previous decoded data block or data packet or data stream.

Optionally, the method includes operating the data processing arrangement to use the at least one key repetitively in combination with seed values for decrypting the plurality of encoded and encrypted data blocks or data packets or data streams.

Optionally, the method includes operating the data processing arrangement to use the at least one key for decrypting the at least first encoded and encrypted data block or data packet or data stream alone.

Optionally, the method includes operating the data processing arrangement to employ an initialization vector (IV) in combination with the at least one key when decrypting the at least first encoded and encrypted data block or data packet or data stream.

Optionally, the method includes operating the data processing arrangement to decrypt and decode the encoded and encrypted data (E2) to generate the corresponding decoded data (D3) in the sequential repetitive manner by branching to a plurality of concurrent sequences of decrypting and decoding of encoded and encrypted data blocks or data packets or data streams using associated seed values.

Optionally, the method includes operating the data processing arrangement to decrypt and decode the encoded and encrypted data (E2) provided in a form of at least one of: encoded and encrypted one-dimensional data, encoded and encrypted multi-dimensional data, encoded and encrypted text data, encoded and encrypted binary data, encoded and encrypted sensor data, encoded and encrypted audio data, encoded and encrypted image data, encoded and encrypted video data.

Optionally, the method includes operating the data processing arrangement to arrange for receiving the at least one key at the decoder, for use in subsequent decrypting and decoding of the encoded and encrypted data (E2), manually or via an encrypted e-mail or via an encrypted communication connection. More optionally, the encrypted communication connection is implemented via Secure Sockets Layer (SSL)/Transport Layer Security (TLS) protocol.

Optionally, the data processing arrangement is implemented by employing at least one Reduced Instruction Set Computing (RISC) processor that is operable to execute program instructions.

In a sixth aspect, embodiments of the present disclosure provide a computer program product comprising a non-transitory (namely non-transient) computer-readable storage medium having computer-readable instructions stored thereon, the computer-readable instructions being executable by a computerized device comprising processing hardware to execute the aforementioned method.

In a seventh aspect, embodiments of the present disclosure provide a codec including the aforementioned encoder and the aforementioned decoder.

The aforementioned methods facilitate a considerable protection improvement as compared with protection achieved with prior art methods using corresponding encryption algorithms. The methods pursuant to embodiments of the present disclosure can be implemented with any suitable encoding solution, irrespective of which encryption algorithm is used. In doing so, these methods do not alter a behavior of an integrated encryption algorithm, which means that the protection provided by the integrated encryption algorithm is not compromised. Thus, the methods pursuant to embodiments of the present disclosure strengthen further the prior art data compression and encryption algorithms.

Moreover, the aforementioned methods can be implemented in connection with common, well-known open source or proprietary data compression software applications, such as 7-Zip or Win-Zip, and so forth ("7-Zip" and "Win-Zip" are proprietary trademarks).

Moreover, integration of encoding and encrypting processes offers an efficient model for multiprocessing, or running several processes in a parallel manner. The integration enables implementation of an optimal processing structure for a given Central Processing Unit (CPU) and a given Graphical Processing Unit (GPU) according to an available computing capacity. Thus, the aforementioned methods enable efficient threading of the integrated encryption process in the encoding process, when data blocks and/or data packets of the input data (D1) are optimized to a format that is optimal for the CPU and the GPU of a system and/or platform in which the encoding process is being run.

The aforementioned methods make it possible to use a very fast, yet efficient encryption algorithm. In this regard, the aforementioned methods use an encryption algorithm efficiently, without interfering with an inner operation of the encryption algorithm itself. Examples of encryption algorithms that are suitable for implementation with the aforementioned methods include, but are not limited to, AES, Twofish, Blowfish, Data Encryption Standard (DES), Triple DES (3-DES), Serpent, International Data Encryption Algorithm (IDEA), MARS, Rivest Cipher 6 (RC6), Camellia, CAST-128, Skipjack, eXtended Tiny Encryption Algorithm (XTEA), and so forth (these example names include registered trademarks).

Moreover, an additional advantage of integrating the encryption process with the encoding process is that the encoded and encrypted data (E2) so produced is not required to be transferred over networks with a protected, secure network connection, for example employing Virtual Private Network (VPN) tunneling, Secure Shell (SSH), or SSL/TLS protocols. Therefore, the aforementioned methods offer an advantageous model for transmitting text, binary, audio, image, video and other types of data, for example, in public Internet networks or in web services and cloud services.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

In overview, embodiments of the present disclosure are concerned with a data encryption method integrated into an encoder, mutatis mutandis a data decryption method integrated into a decoder. Data encoded and encrypted by the encoder using the aforementioned integrated encrypting method cannot be decrypted and decoded without employing a similar integration into an associated decoder.

In the present disclosure, there is described an encrypting process that is integrated into an encoding process of a given encoder being used. This makes an associated encryption considerably stronger, without weakening a performance and capacity of an encryption algorithm employed by the encrypting process. The aforementioned integrated method beneficially uses already-known encryption algorithms. Integration of the encryption process is optionally implemented in encoders that encode data blocks and/or data packets and process one-dimensional or multi-dimensional text, binary, audio, image, video or other types of data.

Embodiments of the present disclosure seek to provide a cost-efficient way to encrypt data, by reducing a complexity of encryption algorithms, thereby saving on computing resources and processing energy expended by data processors. Moreover, with identical encryption algorithm settings, embodiments of the present disclosure offer considerably stronger protection than prior art solutions. This means, for example, that there will be no need to add extra computing resources to achieve a better data protection level.

It will be evident to a person skilled in the art that unencrypted information is called "plaintext", and correspondingly, encrypted information is called "ciphertext" throughout the present disclosure.

Figure 1:
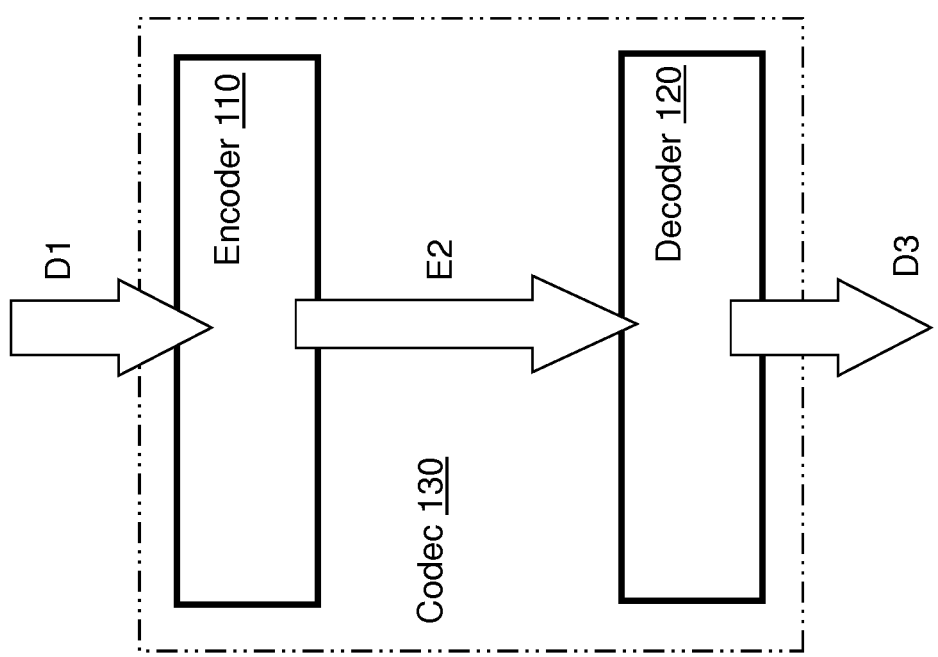
FIG. 1 is a schematic illustration of an encoder for encoding and encrypting input data (D1) to generate corresponding encoded and encrypted data (E2) and a decoder for decrypting and decoding the encoded and encrypted data (E2) to generate corresponding decoded data (D3), wherein the encoder and the decoder collectively form a codec, in accordance with an embodiment of the present disclosure.

Referring to FIG. 1, embodiments of the present disclosure concern:

(i) an encoder 110 for encoding and encrypting input data (D1) to generate corresponding encoded and encrypted data (E2), and corresponding methods of encoding and encrypting the input data (D1) to generate the encoded and encrypted data (E2);

(ii) a decoder 120 for decrypting and decoding the encoded and encrypted data (E2) to generate corresponding decoded data (D3), and corresponding methods of decrypting and decoding the encoded and encrypted data (E2) to generate the decoded data (D3); and (iii) a codec 130 including a combination of at least one encoder and at least one decoder, namely a combination of the encoder 110 and the decoder 120.

Optionally, the decoded data (D3) is exactly similar to the input data (D1), as in a lossless mode of operation. Alternatively, optionally, the decoded data (D3) is approximately similar to the input data (D1), as in a lossy mode of operation. Yet alternatively, optionally, the decoded data (D3) is different to the input data (D1), for example by way of a transformation, but retains substantially similar information present in the input data (D1); for example, the decoded data (D3) is usefully made different to the input data (D1) when reformatting of the decoded data (D3) is also required, for example to be compatible with different types of communication platforms, software layers, communication devices, and so forth.

The encoder 110 includes a data processing arrangement for processing the input data (D1) to generate the corresponding encoded and encrypted data (E2). Optionally, the data processing arrangement of the encoder 110 is implemented by employing at least one Reduced Instruction Set Computing (RISC) processor that is operable to execute program instructions as will be elucidated in detail below; such a RISC processor is capable of performing relatively simpler concatenated operations at very great speed, and suitable for encoding and decoding data provided in a streamed format, for example in real-time.

Optionally, the data processing arrangement of the encoder 110 is operable to encode and encrypt the input data (D1) provided in a form of at least one of: one-dimensional data, multi-dimensional data, text data, binary data, sensor data, audio data, image data, video data, but not limited thereto. The input data (D1) includes a plurality of data blocks and/or data packets. Optionally, the input data (D1) is received as a stream of data, or a data file.

Optionally, the data processing arrangement of the encoder 110 is supplied in operation with at least one key for use in generating the encoded and encrypted data (E2). Alternatively, optionally, the data processing arrangement of the encoder 110 is operable to generate the at least one key using a suitable key generation algorithm.

The data processing arrangement of the encoder 110 is operable to encode a first data block and/or data packet of the plurality of data blocks and/or data packets to generate a first encoded data block and/or data packet. The data processing arrangement of the encoder 110 is then operable to encrypt the first encoded data block and/or data packet using the at least one key to provide a first encoded and encrypted data block and/or data packet for inclusion in the encoded and encrypted data (E2).

Moreover, the data processing arrangement of the encoder 110 is operable to generate a first seed value for use in encrypting a next encoded data block and/or data packet to provide a next encoded and encrypted data block and/or data packet for inclusion in the encoded and encrypted data (E2). Subsequently, the data processing arrangement of the encoder 110 is operable to generate a next seed value for use in encrypting a subsequent encoded data block and/or data packet, in a sequential repetitive manner until the plurality of data blocks and/or data packets are encoded and encrypted into the encoded and encrypted data (E2).

Optionally, the plurality of data blocks and/or data packets are encoded and encrypted one-by-one, in phases, into the encoded and encrypted data (E2), namely in a form of a plurality of encoded and encrypted data blocks and/or data packets.

It will be appreciated that a technical implementation of the encoder 110 may vary depending on an encoding algorithm and an encryption algorithm being used to perform an encoding process and an encrypting process, respectively. Nonetheless, the technical implementation integrates the encoding and encrypting processes. In other words, it will be appreciated that a selected encryption algorithm is beneficially included, namely embedded, into the encoder 110.

The integration aims to generate a seed value for each subsequent data block and/or data packet to be encoded and encrypted based on its previous data block and/or data packet. As a result, subsequent decryption of each encoded and encrypted data block and/or data packet is dependent upon decryption and decoding of its previous encoded and encrypted data block and/or data packet, namely in the sequential repetitive manner as will be elucidated in greater detail below. Such a sequential repetitive manner of encryption by employing seed values enhances an operation of the encryption algorithm, as an intruding attacker will have to produce an entire functionality of both the encoder 110 and the decoder 120 to be able to find a possible solution for decrypting and decoding the encoded and encrypted data (E2).

In an alternative implementation, a given data block and/or data packet can be first encrypted, and then be encoded into the encoded and encrypted data (E2). However, it will be appreciated that performing encoding of data blocks and/or data packets before encrypting is advantageous, as the input data (D1) often includes a lot of small variations in subsequent data blocks and/or data packets as compared to previous data blocks and/or data packets, namely partial or full duplicates of previous data blocks and/or data packets. Thus, the data processing arrangement of the encoder 110 is operable to employ a suitable data de-duplication technique to encode the plurality of data blocks and/or data packets of the input data (D1) into a plurality of encoded data blocks and/or data packets. As one example, a method described in GB 1411451.6 can be used to encode the plurality of data blocks and/or data packets. As another example, a method described in GB 1411531.5 can be used to encode the plurality of data blocks and/or data packets.

Moreover, optionally, the data processing arrangement of the encoder 110 is operable to perform an additional encoding process on the plurality of encoded data blocks and/or data packets, before or after the plurality of encoded data blocks and/or data packets are encrypted. For this purpose, the data processing arrangement of the encoder 110 is optionally operable to employ at least one of: entropy-modifying encoding, delta encoding, ODelta encoding, 1 u or 8 u range encoding, Run Length Encoding (RLE), Split RLE (SRLE), and/or interpolation encoding. Herein, the term "delta encoding" refers to a way of storing or transmitting data in a form of differences between sequential data rather than complete data files, while the term "ODelta" refers to a differential form of encoding based upon wrap-around in a binary counting regime, for example as described in a patent document GB 1303661.1, hereby incorporated by reference. The term "SRLE" or "Split RLE" refers to Split Run-Length Encoding method as described in a patent document GB 1303660.3

In an example, the data processing arrangement of the encoder 110 is optionally operable to compress further the plurality of encoded data blocks and/or data packets before encryption, by employing one or more suitable entropy-modifying encoding methods.

As an example, a Gurulogic Multi-Variate Codec (GMVC®) coding solution available from Gurulogic Microsystems Oy is beneficially used. The GMVC® is able to encode different types of data very efficiently, while producing several different data streams that contain an entire information of an original input, namely the input data (D1), efficiently in an entropy-encoded manner. For example, in the aforementioned proprietary GMVC® coding solution, encoding of image data or video data employs mutually different methods to produce various different data streams, depending on content of the input data (D1), as described in patent documents GB 2503295A ("Encoder and method") and GB2505169A ("Decoder and method"). Therefore, it is advantageous that different types of data are compressed efficiently with different entropy encoders that are optimal for precisely those types of data, while taking into account a bit count and an entropy of the input data (D1), before encrypting to generate the encoded and encrypted data (E2).

In this regard, optionally, the data processing arrangement, for example implemented using one or more aforesaid RISC processors, of the encoder 110 is operable to encode and encrypt the input data (D1) to generate the corresponding encoded and encrypted data (E2) in the sequential repetitive manner by branching to a plurality of concurrent sequences of encoding and encrypting of data blocks and/or data packets using associated seed values; such a RISC processor is capable of performing relatively simpler concatenated operations at very great speed, and suitable for encoding and decoding data provided in a streamed format, for example in real-time. This allows running several concurrent processes in a parallel manner to provide more rapid processing of the input data (D1), as well as providing an enhanced degree of encryption security, because the decoder 120 is required to employ a similar form of branching when decoding the encoded and encrypted data (E2).

Optionally, in order to implement branching, the input data (D1) is sub-divided into different steams of data blocks and/or data packets, for example, for each type of data present in the input data (D1). Beneficially, different encoding and encryption algorithms are used for different data streams.

Additionally or alternatively, optionally, branching can be usefully implemented to make the encoding and encrypting processes faster, even when the input data (D1) includes a same type of data. In this regard, the encoded and encrypted data (E2) optionally includes information indicative of how the input data (D1) is divided to implement the branching, for use in subsequent decrypting and decoding of the encoded and encrypted data (E2).

Optionally, the data processing arrangement of the encoder 110 is operable to use the at least one key repetitively in combination with the seed values for encrypting encoded data blocks and/or data packets for inclusion in the encoded and encrypted data (E2). In an example, the data processing arrangement of the encoder 110 is optionally operable to prepend the seed values to the at least one key for encrypting the encoded data blocks and/or data packets. In another example, the data processing arrangement of the encoder 110 is optionally operable to append the seed values to the at least one key for encrypting the encoded data blocks and/or data packets.

Alternatively, optionally, the data processing arrangement of the encoder 110 is operable to use the at least one key for encrypting the first encoded data block and/or data packet. In such a case, the data processing arrangement of the encoder 110 is optionally operable to use the seed values alone for encrypting subsequent encoded data blocks and/or data packets for inclusion in the encoded and encrypted data (E2). In other words, the first encoded data block and/or data packet is encrypted using the at least one key alone.

Moreover, optionally, the data processing arrangement of the encoder 110 is operable to employ an initialization vector (IV) in combination with the at least one key for encrypting the first encoded data block and/or data packet.

Furthermore, in one technical implementation model employed in an embodiment of the present disclosure, an intercept functionality is written into the encoder 110 to enable generation of the seed values, namely to call program routines or functions for generating the seed values.

In one embodiment of the present disclosure, information used to generate the seed values is defined or delivered to the decoder 120, so that the encrypting process can be reversed during subsequent decryption. In this regard, the data processing arrangement of the encoder 110 is optionally operable to include in the encoded and encrypted data (E2) information indicative of at least one algorithm employed for generating the seed values for use in encrypting the encoded data blocks and/or data packets.

Varying seed values between the data blocks and/or data packets improves an efficiency of the encrypting process.

The seed values can be computed from potentially almost any sort of information present in the input data (D1). However, it will be appreciated that a seed value is beneficially not computed from processed data providing substantially the encoded and encrypted data (E2), because then the integration of the encoding and encrypting processes would not produce a seed value whose generation, during subsequent decryption at the decoder 120, would require an interpretation of the encoding and encrypting processes. In other words, a seed value is beneficially computed from varying instantaneous information produced by the encoding process that cannot be directly derived from the encoded and encrypted data (E2) alone. Optionally, a seed value is requested by the process with the help of changing parameters.

In one implementation, a seed value is computed before the encoding process is performed by using, for example, a check sum or a hash function. This potentially makes an associated decryption process slightly simpler, but still improved as compared with known prior art methods. In an example, the check sum or the hash function is computed on at least a portion of a given data block and/or data packet of the input data (D1). It will be appreciated that seed values cannot be created based upon two-way initial values, to prevent reverse engineering the seed values. Moreover, nor can seed values be created based upon prediction, to prevent using probability calculations. Beneficially, the seed values are computed using one-way hashing algorithms.

In another implementation, a seed value is computed before the encrypting process is performed by using a Cipher-Block Chaining (CBC) mode of an Advanced Encryption Standard (AES) encryption algorithm. In such a case, an encrypted output of a previous data block and/or data packet, namely ciphertext, is combined with a given data block and/or data packet being encrypted, namely plaintext. This means that the CBC mode of the AES encryption algorithm works otherwise as normally, but the seed value generated by the encoding process is inserted into an encrypted output, namely the encoded and encrypted data (E2). The encrypting process can also take place by using a stream cipher, namely a symmetric key cipher, wherein plain-text digits are combined with a pseudo-random cipher digit stream, namely a "keystream". In such a case, data blocks and/or data packets are replaced by one or more data streams.

There are several optional ways in which seed values can be computed, used and/or transmitted for such a seed-based encryption, in embodiments of the present disclosure. These options depend, for example, upon a given usage scenario and/or target of the encoded and encrypted data (E2), and/or upon the encryption algorithm employed for the encrypting process.

In an alternative embodiment of the present disclosure, information which is at least partially indicatively as to how the seed values are generated is optionally transmitted from the encoder 110 to the decoder 120, if the information used to generate the seed values is not otherwise defined or delivered to the decoder 120. This is particularly beneficial in a case where the seed values are not related to the input data (D1) or are generated randomly. However, for security reasons, it is desirable that seed values as such are never transmitted for security reasons.

Furthermore, optionally, the encoder 110 is operable to communicate the encoded and encrypted data (E2) to a data server and/or data storage (not shown in FIG. 1) for storing in a database (not shown in FIG. 1). The data server and/or data storage is arranged to be accessible to the decoder 120, which is beneficially compatible with the encoder 110, for subsequently decrypting and decoding the encoded and encrypted data (E2).

Additionally, optionally, the encoder 110 is operable to communicate the at least one key and/or the initialization vector IV and/or the information indicative of the at least one algorithm employed for generating the seed values to the data server and/or data storage for storing in the database.

In some examples, the decoder 120 is optionally operable to access the encoded and encrypted data (E2) from the data server and/or data storage. Additionally, optionally, the decoder 120 is operable to access the at least one key and/or the IV and/or the information indicative of the at least one algorithm employed for generating the seed values from the data server and/or another data server and/or data storage.

In alternative examples, the encoder 110 is optionally operable to stream the encoded and encrypted data (E2) to the decoder 120, either via a communication network or via a direct connection. Moreover, it is to be noted that a device equipped with a hardware-based or software-based encoder can also communicate directly with another device equipped with a hardware-based or software-based decoder.

In yet other alternative examples, the decoder 120 is optionally implemented so as to retrieve the encoded and encrypted data (E2) from a non-transitory (namely non-transient) computer-readable storage medium, such as a hard drive and a Solid-State Drive (SSD).

Moreover, optionally, the data processing arrangement of the encoder 110 is operable to arrange for delivery of the at least one key from the encoder 110 to the decoder 120, for use in subsequent decrypting and decoding of the encoded and encrypted data (E2). Optionally, the at least one key is delivered from the encoder 110 to the decoder 120 manually between respective users thereof. Alternatively, optionally, the at least one key is delivered from the encoder 110 to the decoder 120 via an encrypted e-mail, for example, such as via an e-mail which is encrypted using Pretty Good Privacy (PGP), GNU Privacy Guard (GnuPG), or similar. Yet alternatively, optionally, the at least one key is delivered from the encoder 110 to the decoder 120 via an encrypted communication connection. Optionally, the encrypted communication connection is implemented via Secure Sockets Layer (SSL)/Transport Layer Security (TLS).

The decoder 120 includes a data processing arrangement for processing the encoded and encrypted data (E2) to generate the corresponding decoded data (D3). Optionally, the data processing arrangement of the decoder 120 is implemented by employing at least one RISC processor that is operable to execute program instructions as will be elucidated in detail later; such a RISC processor is capable of performing relatively simpler concatenated operations at very great speed, and suitable for encoding and decoding data provided in a streamed format, for example in real-time.

Optionally, the data processing arrangement of the decoder 120 is operable to decrypt and decode the encoded and encrypted data (E2) provided in a form of at least one of: encoded and encrypted one-dimensional data, encoded and encrypted multi-dimensional data, encoded and encrypted text data, encoded and encrypted binary data, encoded and encrypted sensor data, encoded and encrypted audio data, encoded and encrypted image data, encoded and encrypted video data, but not limited thereto.

As described earlier, the data processing arrangement of the decoder 120 is supplied in operation with the at least one key for use in generating the decoded data (D3).

The data processing arrangement of the decoder 120 is operable to decrypt a first encoded and encrypted data block and/or data packet of the plurality of encoded and encrypted data blocks and/or data packets using the at least one key to generate a first encoded data block and/or data packet. The data processing arrangement of the decoder 120 is then operable to decode the first encoded data block and/or data packet to provide a first decoded data block and/or data packet for inclusion in the decoded data (D3).

As described earlier, the encoded and encrypted data (E2) beneficially includes the information indicative of the at least one algorithm employed at the encoder 110 for generating the seed values for use in encrypting the encoded data blocks and/or data packets. Using this information, the data processing arrangement of the decoder 120 is operable to generate a first seed value for use in decrypting a next encoded and encrypted data block and/or data packet of the plurality of encoded and encrypted data blocks and/or data packets to generate a next encoded data block and/or data packet. The data processing arrangement of the decoder 120 is then operable to decode the next encoded data block and/or data packet to provide a next decoded data block and/or data packet for inclusion in the decoded data (D3).

Subsequently, the data processing arrangement of the decoder 120 is operable to generate a next seed value for use in decrypting and decoding a subsequent encoded and encrypted data block and/or data packet of the plurality of encoded and encrypted data blocks and/or data packets, in a sequential repetitive manner until the plurality of encoded and encrypted data blocks and/or data packets of the encoded and encrypted data (E2) are decrypted and decoded into the decoded data (D3).

In this manner, optionally, the plurality of encoded and encrypted data blocks and/or data packets of the encoded and encrypted data (E2) are decrypted and decoded one-by-one, in phases, into the decoded data (D3).

Moreover, optionally, in order to generate the decoded data (D3), the data processing arrangement of the decoder 120 is operable to perform a reverse of an encoding and encrypting process performed by the data processing arrangement of the encoder 110. In this regard, optionally, the data processing arrangement of the decoder 120 is operable to perform an additional decoding process on the encoded data blocks and/or data packets by employing at least one of: entropy-modifying decoding, delta decoding, ODelta decoding, 1 u or 8 u range decoding, run length decoding, split run length decoding, and/or interpolation decoding.

Moreover, optionally, the data processing arrangement of the decoder 120 is operable to decrypt and decode the encoded and encrypted data (E2) to generate the corresponding decoded data (D3) in the sequential repetitive manner by branching to a plurality of concurrent sequences of decrypting and decoding of encoded and encrypted data blocks and/or data packets using associated seed values. Optionally, in order to implement such branching, the encoded and encrypted data (E2) includes different steams of encoded and encrypted data blocks and/or data packets, for example, for each different type of data present in the input data (D1).

Optionally, the data processing arrangement of the decoder 120 is operable to use the at least one key repetitively in combination with the seed values for decrypting the encoded and encrypted data blocks and/or data packets of the encoded and encrypted data (E2). In an example, the data processing arrangement of the decoder 120 is optionally operable to prepend the seed values to the at least one key for decrypting the encoded and encrypted data blocks and/or data packets. In another example, the data processing arrangement of the decoder 120 is optionally operable to append the seed values to the at least one key for decrypting the encoded and encrypted data blocks and/or data packets.

Alternatively, optionally, the data processing arrangement of the decoder 120 is operable to use the at least one key for decrypting the first encoded and encrypted data block and/or data packet alone. In such a case, the data processing arrangement of the decoder 120 is optionally operable to use the seed values alone for decrypting subsequent encoded and encrypted data blocks and/or data packets.

Moreover, optionally, the data processing arrangement of the decoder 120 is operable to employ an initialization vector (IV) in combination with the at least one key for decrypting the first encoded and encrypted data block and/or data packet.

Furthermore, optionally, during encoding, a given data block and/or data packet is processed to generate a seed value for use in encrypting its subsequent data block and/or data packet. As a result, the seed value is based on contents of the given data block and/or data packet. Thus, during decrypting and decoding, a given encoded and encrypted data block and/or data packet needs to be decrypted and decoded correctly to enable decrypting and decoding a subsequent encoded and encrypted data block and/or data packet correctly. In this manner, generation of the decoded data (D3) from the encoded and encrypted data (E2) requires performing decrypting and decoding of the plurality of encoded and encrypted data blocks and/or data packets one-by-one, in phases.

The aforementioned integration of the encoding and encrypting processes increases an amount of computing resources that an intruding attacker will require to break an encryption so achieved. As a result, a time required in attempting to break the encryption potentially presents a novel challenge to cryptanalysts.

From a technical point of view, it is cost-efficient to encode the plurality of data blocks and/or data packets of the input data (D1) before encrypting, for example by way of data compression, because in such a case, an entropy and a data size of the encoded and encrypted data (E2) is smaller than if the input data (D1) were encrypted before compression. The encryption algorithm typically tends to produce maximum data entropy in the encoded and encrypted data (E2), which mathematically means that there are as many alternatives for deciphering the encoded and encrypted data (E2) as is theoretically possible. It will be appreciated that compression is optionally also subject to the whole input data (D1) instead of individual data blocks and/or data packets thereof. In such a case, there is utilized a mechanism for temporarily storing the seed values produced by the compression, namely encoding, in a secured manner, for example as encrypted data.

FIG. 1 is merely an example, which should not unduly limit the scope of the claims herein. It is to be understood that the specific designation for the codec 130 is provided as an example and is not to be construed as limiting the codec 130 to specific numbers, types, or arrangements of encoders and decoders. A person skilled in the art will recognize many variations, alternatives, and modifications of embodiments of the present disclosure.

Optionally, the codec 130 is implemented within a single device. Alternatively, optionally, the codec 130 is effectively implemented between multiple devices. Optionally, the codec 130 is implemented as custom-design digital hardware, for example via use of one or more application-specific integrated circuits (ASIC's). Alternatively, or additionally, the codec is implemented in computer software instructions executable upon computing hardware.

The codec 130 can be implemented as at least one of: a data codec, an audio codec, an image codec and/or a video codec, but not limited thereto.

Moreover, the codec 130 can be implemented to provide a secure communication between senders and receivers, while considerably saving network bandwidth required for data transfer, and without requiring an encrypted communication connection, such as SSL/TLS, for data transfer. In an example, the codec 130 can be implemented in such systems that are based on request-response type communications, such as HyperText Transfer Protocol (HTTP) that is used in web browsers and World Wide Web (www) servers for data transfer.

Although it is probable that data encrypted today can be broken into and decrypted by using a "brute force attack" technique in the future, it is assumed that future encryption algorithms will correspondingly generate stronger encryption keys than current encryption algorithms, thus still ensuring strong encryption of data.

In addition to the "brute force attack" technique, there are other well-known attack techniques, such as "biclique attack", "related-key attack", "padding oracle attack", "length extension attack" techniques and so forth, but these techniques essentially fail in breaking the encryption performed by the encoder 110.

For illustration purposes only, there is next provided a technical example of an encrypting process as executed within the encoder 110. In this example, one generally efficient model is presented for encrypting an unencrypted plaintext data stream by using a symmetric AES encryption algorithm in CBC mode and a seed value with an expanded encryption key pursuant to following steps:

1. Obtain or generate two encryption keys, namely Key1 and Key2;
2. Generate cryptographic random Initialization Vector (IV) bytes for AES CBC;
3. Encrypt Plaintext bytes (namely, encoded data blocks and/or data packets) to Ciphertext bytes (namely, encoded and encrypted data blocks and/or data packets) using AES CBC function with Key1 and IV or Key1 and Salt;
4. Merge IV and Ciphertext bytes;

5. Create Message Authentication Code (MAC) bytes using HMAC function with Key2 and Ciphertext; and
6. Write MAC and Ciphertext bytes to data stream, namely encoded and encrypted data (E2).

Moreover, a pseudo code for the aforementioned algorithm is presented as follows:

Key1=KeyStretch(GetKey( ))
Key2=KeyStretch(GetKey( ))
IV=Random( )
Ciphertext=IV+AES(Key1+Salt, IV, Plaintext)
MAC=HMAC(Key2, Ciphertext)
DATA=MAC+Ciphertext In the example above, two strengthened keys have been created using a "key stretching" technique. The "key stretching" technique is typically implemented by running a password for encrypting thousands of times through a one-way digest algorithm, namely a hashing algorithm. This creates enough permutations to protect the password from attacks, namely key-related attacks.

Thereafter, corresponding random Initialization Vector (IV) bytes are created for the CBC mode. These IV bytes are then scrambled and blended into a first encoded data block and/or data packet to be encrypted. The first encoded data block and/or data packet is then encrypted using the symmetric AES encryption algorithm in the CBC mode with a multiply expanded key and IV bytes.

Using the IV bytes for the first encoded data block and/or data packet is particularly beneficial for purposes of improving a degree of protection of the encryption thereby obtained, for example, in cases where the input data (D1) contains a lot of redundant data. As a result, an intruding attacker cannot decrypt an entire sequence of information, namely the input data (D1), before each encoded and encrypted data block and/or data packet of the encoded and encrypted data (E2) has been broken from start to finish.

Next, subsequent encoded data blocks and/or data packets are encrypted using the symmetric AES encryption algorithm in the CBC mode with a multiply expanded key and seed values generated by the encoding process.

Finally, Message Authentication Code (MAC) bytes are inserted into the Ciphertext, namely into the encoded and encrypted data (E2). This prevents possibly identical ciphertext caused by possibly occurring redundant plaintext in the input data (D1), and also prevents the encryption from being broken, for example via a "padding oracle attack" technique. This also ensures that the integrity of the encoded and encrypted data (E2) is intact.

It will be appreciated that despite the embodiment described in the diagrams being presented using CBC, namely Cipher-Block Chaining mode, embodiments of the present disclosure can be also implemented by using a stream cipher, wherein data blocks and/or data packets are replaced by one or more data streams.

Figure 2:
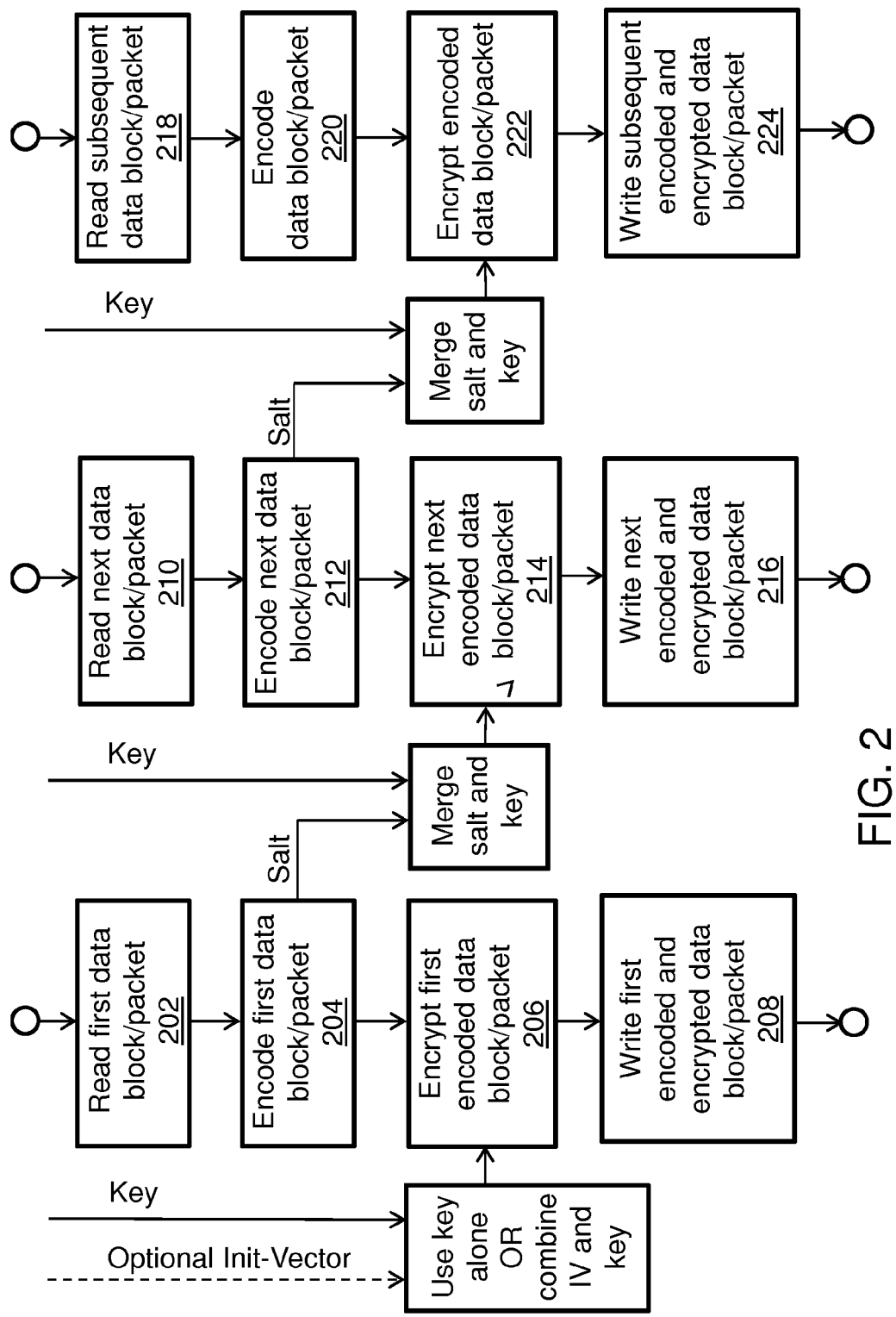
FIG. 2 is a schematic illustration of a flow chart depicting steps of a first integrated method of encoding and encrypting input data (D1) to generate corresponding encoded and encrypted data (E2), in accordance with an embodiment of the present disclosure.

Referring now to FIG. 2, there is provided a flow chart depicting steps of a first integrated method of encoding and encrypting input data (D1), including a plurality of data blocks and/or data packets, to generate corresponding encoded and encrypted data (E2), in accordance with an embodiment of the present disclosure. The method is depicted as a collection of steps in a logical flow diagram, which represents a sequence of steps that can be implemented in hardware, software, or a combination thereof, for example as aforementioned.

For illustration purposes only, the method will next be illustrated with reference to the encoder 110 depicted in FIG. 1.

At a step 202, the data processing arrangement of the encoder 110 reads or receives a first data block and/or data packet of the plurality of data blocks and/or data packets.

Next, at a step 204, the data processing arrangement of the encoder 110 encodes the first data block and/or data packet to generate a first encoded data block and/or data packet.

Optionally, at the step 204, the data processing arrangement of the encoder 110 processes the first data block and/or data packet to generate a first seed value for use in encryption of a next data block and/or data packet of the plurality of data blocks and/or data packets. The seed value is interchangeably referred to as "salt" hereinafter.

Subsequently, at a step 206, the data processing arrangement of the encoder 110 encrypts the first encoded data block and/or data packet using at least one key to provide a first encoded and encrypted data block and/or data packet for inclusion in the encoded and encrypted data (E2).

Optionally, the data processing arrangement of the encoder 110 is supplied with at least one key for use in generating the encoded and encrypted data (E2). Alternatively, optionally, the data processing arrangement of the encoder 110 generates the at least one key using a suitable key generation algorithm.

Additionally, optionally, the data processing arrangement of the encoder 110 employs an initialization vector (IV) in combination with the at least one key for encrypting the first encoded data block and/or data packet at the step 206.

Next, at a step 208, the data processing arrangement of the encoder 110 writes or transmits the first encoded and encrypted data block and/or data packet in the encoded and encrypted data (E2).

At a step 210, the data processing arrangement of the encoder 110 reads or receives the next data block and/or data packet of the plurality of data blocks and/or data packets.

Next, at a step 212, the data processing arrangement of the encoder 110 encodes the next data block and/or data packet to generate a next encoded data block and/or data packet.

Optionally, at the step 212, the data processing arrangement of the encoder 110 processes the next data block and/or data packet to generate a next seed value for use in encryption of a subsequent data block and/or data packet of the plurality of data blocks and/or data packets.

Subsequently, at a step 214, the data processing arrangement of the encoder 110 encrypts the next encoded data block and/or data packet using the first seed value generated at the step 204 in combination with the at least one key to provide a next encoded and encrypted data block and/or data packet for inclusion in the encoded and encrypted data (E2).

For this purpose, the first seed value and the at least one key can be merged in various ways. As an example, the at least one key is salted by prepending or appending the first seed value to the at least one key.

Next, at a step 216, the data processing arrangement of the encoder 110 writes or transmits the next encoded and encrypted data block and/or data packet in the encoded and encrypted data (E2).

Likewise, at a step 218, the data processing arrangement of the encoder 110 reads or receives the subsequent data block and/or data packet of the plurality of data blocks and/or data packets.

Next, at a step 220, the data processing arrangement of the encoder 110 encodes the subsequent data block and/or data packet to generate a subsequent encoded data block and/or data packet.

Optionally, at the step 220, the data processing arrangement of the encoder 110 processes the subsequent data block and/or data packet to generate a subsequent seed value (not shown in FIG. 2) for use in encryption of a yet subsequent data block and/or data packet of the plurality of data blocks and/or data packets.

Subsequently, at a step 222, the data processing arrangement of the encoder 110 encrypts the subsequent encoded data block and/or data packet using the next seed value generated at the step 212 in combination with the at least one key to provide a subsequent encoded and encrypted data block and/or data packet for inclusion in the encoded and encrypted data (E2). For this purpose, the next seed value and the at least one key can be merged, for example, by prepending or appending the next seed value to the at least one key.

Next, at a step 224, the data processing arrangement of the encoder 110 writes or transmits the subsequent encoded and encrypted data block and/or data packet in the encoded and encrypted data (E2).

The steps 218 to 224 are performed in a sequential repetitive manner until the plurality of data blocks and/or data packets of the input data (D1) are encoded and encrypted into the encoded and encrypted data (E2).

The steps 202 to 224 are only illustrative and other alternatives can also be provided where one or more steps are added, one or more steps are removed, or one or more steps are provided in a different sequence without departing from the scope of the claims herein. In an alternative embodiment, encoding of the plurality of data blocks and/or data packets is performed, before encrypting of their corresponding encoded data blocks and/or data packets begins. In other words, the steps 202, 204, 210, 212, 218 and 220, namely the steps pertaining to reading and encoding of data blocks and/or data packets of the input data (D1), are performed before the steps 206, 208, 214, 216, 222 and 224, namely the steps pertaining to encrypting of encoded data blocks and/or data packets and writing to the encoded and encrypted data (E2), are performed.

As shown in FIG. 2, the steps 206, 214 and 222 are optionally performed using the CBC mode of the symmetric AES encryption algorithm. The step 206 is optionally performed using a randomly-generated IV, which is merged with the at least one key. The steps 214 and 222 are performed using their associated salts, namely the seed values generated at the steps 204 and 212, respectively. In an example, a base 64 version of value bits associated with a given data block and/or data packet is used as a salt for its subsequent data block and/or data packet.

It will be appreciated that the method depicted in FIG. 2 can be implemented using other encryption algorithms, irrespective of whether or not IV is used for encrypting the first encoded data block and/or data packet, and irrespective of whether or not the chained CBC mode is used.

Embodiments of the present disclosure provide a computer program product comprising a non-transitory (namely non-transient) computer-readable storage medium having computer-readable instructions stored thereon, the computer-readable instructions being executable by a computerized device comprising processing hardware to execute the first integrated method as described in conjunction with FIG. 2. The computer-readable instructions are optionally downloadable from a software application store, for example, from an "App store" to the computerized device.

Figure 3:
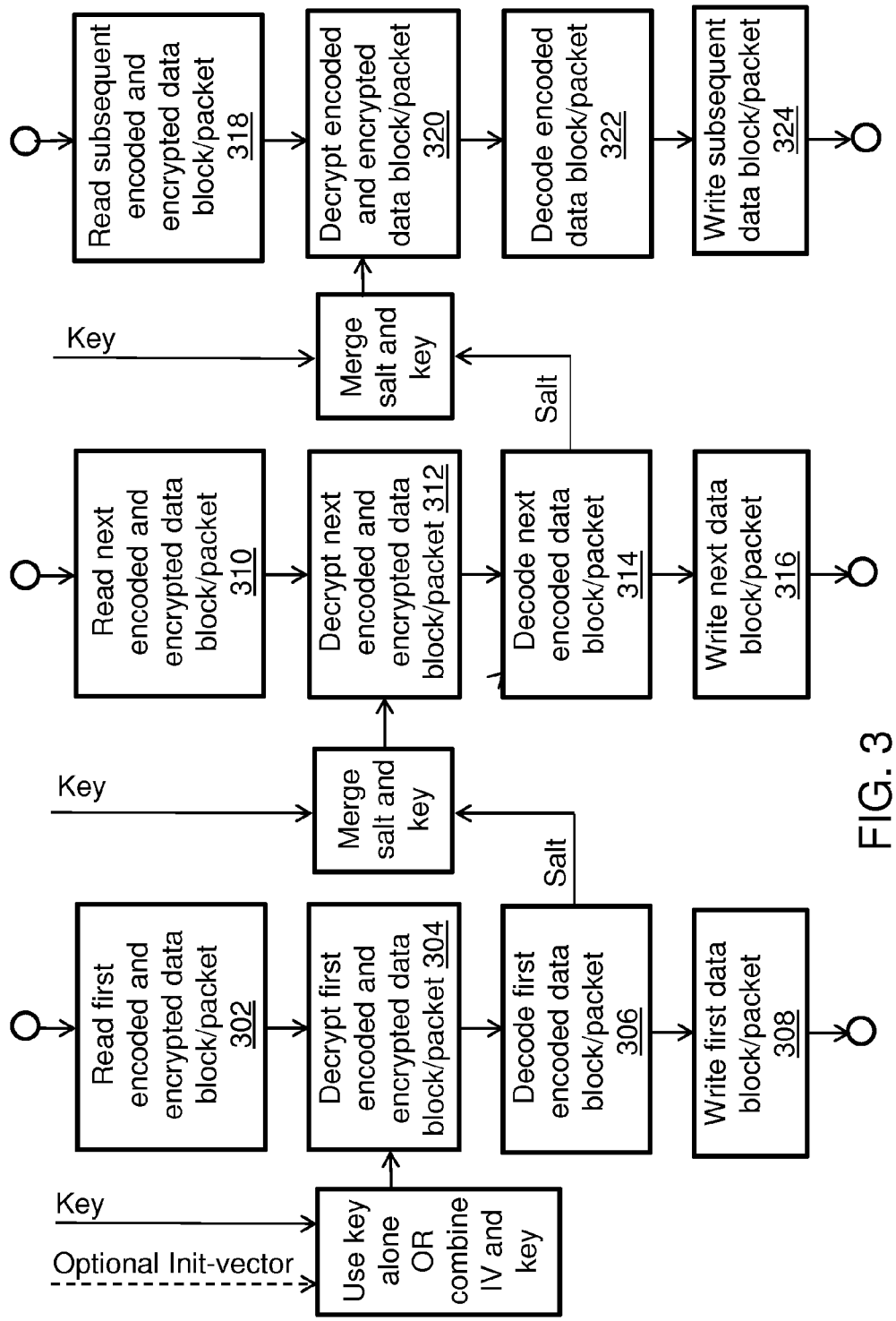
FIG. 3 is a schematic illustration of a flow chart depicting steps of a second integrated method of decrypting and decoding encoded and encrypted data (E2) to generate corresponding decoded data (D3), in accordance with an embodiment of the present disclosure.

FIG. 3 is a schematic illustration of a flow chart depicting steps of a second integrated method of decrypting and decoding encoded and encrypted data (E2), including a plurality of encoded and encrypted data blocks and/or data packets, to generate corresponding decoded data (D3), in accordance with an embodiment of the present disclosure. The method is depicted as a collection of steps in a logical flow diagram, which represents a sequence of steps that can be implemented in hardware, software, or a combination thereof.

For illustration purposes only, the method will next be illustrated with reference to the decoder 120 depicted in FIG. 1.

At a step 302, the data processing arrangement of the decoder 120 reads or receives a first encoded and encrypted data block and/or data packet of the plurality of encoded and encrypted data blocks and/or data packets.

Next, at a step 304, the data processing arrangement of the decoder 120 decrypts the first encoded and encrypted data block and/or data packet using at least one key to generate a first encoded data block and/or data packet.

Optionally, the data processing arrangement of the decoder 120 is supplied with the at least one key for use in generating the decoded data (D3).

Additionally, optionally, the data processing arrangement of the decoder 120 employs an initialization vector (IV) in combination with the at least one key for decrypting the first encoded and encrypted data block and/or data packet at the step 304.

Subsequently, at a step 306, the data processing arrangement of the decoder 120 decodes the first encoded data block and/or data packet to provide a first decoded data block and/or data packet for inclusion in the decoded data (D3).

Optionally, at the step 306, the data processing arrangement of the decoder 120 processes the first decoded data block and/or data packet to generate a first seed value for use in decryption of a next encoded and encrypted data block and/or data packet of the plurality of encoded and encrypted data blocks and/or data packets.

Next, at a step 308, the data processing arrangement of the decoder 120 writes or transmits the first decoded data block and/or data packet in the decoded data (D3).

At a step 310, the data processing arrangement of the decoder 120 reads or receives the next encoded and encrypted data block and/or data packet of the plurality of encoded and encrypted data blocks and/or data packets.

Next, at a step 312, the data processing arrangement of the decoder 120 decrypts the next encoded and encrypted data block and/or data packet using the first seed value generated at the step 306 in combination with the at least one key to generate a next encoded data block and/or data packet.

For this purpose, the first seed value and the at least one key can be merged in various ways. As an example, the at least one key is salted by prepending or appending the first seed value to the at least one key.

Subsequently, at a step 314, the data processing arrangement of the decoder 120 decodes the next encoded data block and/or data packet to provide a next decoded data block and/or data packet for inclusion in the decoded data (D3).

Optionally, at the step 314, the data processing arrangement of the decoder 120 processes the next decoded data block and/or data packet to generate a next seed value for use in decryption of a subsequent encoded and encrypted data block and/or data packet of the plurality of encoded and encrypted data blocks and/or data packets.

Next, at a step 316, the data processing arrangement of the decoder 120 writes or transmits the next decoded data block and/or data packet in the decoded data (D3).

Likewise, at a step 318, the data processing arrangement of the decoder 120 reads or receives the subsequent encoded and encrypted data block and/or data packet of the plurality of encoded and encrypted data blocks and/or data packets.

Next, at a step 320, the data processing arrangement of the decoder 120 decrypts the subsequent encoded and encrypted data block and/or data packet using the next seed value generated at the step 314 in combination with the at least one key to generate a subsequent encoded data block and/or data packet.

For this purpose, the next seed value and the at least one key can be merged, for example, by prepending or appending the next seed value to the at least one key.

Subsequently, at a step 322, the data processing arrangement of the decoder 120 decodes the subsequent encoded data block and/or data packet to provide a subsequent decoded data block and/or data packet for inclusion in the decoded data (D3).

Optionally, at the step 322, the data processing arrangement of the decoder 120 processes the subsequent decoded data block and/or data packet to generate a subsequent seed value (not shown in FIG. 3) for use in decryption of a yet subsequent encoded and encrypted data block and/or data packet of the plurality of encoded and encrypted data blocks and/or data packets.

Next, at a step 324, the data processing arrangement of the decoder 120 writes or transmits the subsequent decoded data block and/or data packet in the decoded data (D3).

The steps 318 to 324 are performed in a sequential repetitive manner until the plurality of encoded and encrypted data blocks and/or data packets of the encoded and encrypted data (E2) are decrypted and decoded into the decoded data (D3).

The steps 302 to 324 are only illustrative and other alternatives can also be provided where one or more steps are added, one or more steps are removed, or one or more steps are provided in a different sequence without departing from the scope of the claims herein.

As shown in FIG. 3, the steps 304, 312 and 320 are optionally performed using the CBC mode of the symmetric AES encryption algorithm. The step 304 is optionally performed using a randomly-generated IV, which is merged with the at least one key. The steps 312 and 320 are performed using their associated salts, namely the seed values generated at the steps 306 and 314, respectively. In an example, a base 64 version of value bits associated with a given decoded data block and/or data packet is used as a salt for a subsequent encoded and encrypted data block and/or data packet.

It will be appreciated that the method depicted in FIG. 3 can be implemented using other decryption algorithms, irrespective of whether or not IV is used for decrypting the first encoded and encrypted data block and/or data packet, and irrespective of whether or not the chained CBC mode is used.

Embodiments of the present disclosure provide a computer program product comprising a non-transitory (namely non-transient) computer-readable storage medium having computer-readable instructions stored thereon, the computer-readable instructions being executable by a computerized device comprising processing hardware to execute the second integrated method as described in conjunction with FIG. 3. The computer-readable instructions are optionally downloadable from a software application store, for example, from an "App store" to the computerized device.

Figure 4:
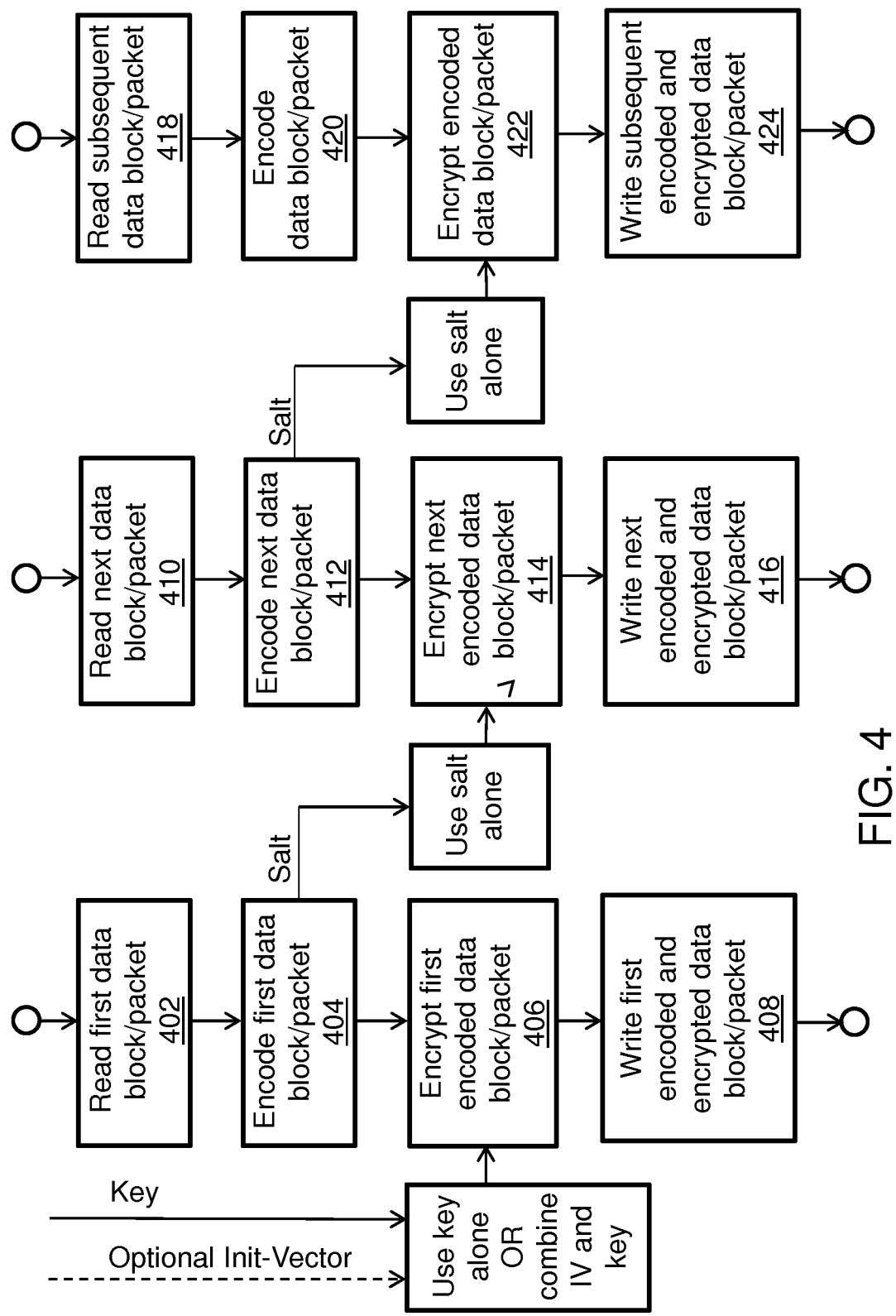
FIG. 4 is a schematic illustration of a flow chart depicting steps of a third integrated method of encoding and encrypting input data (D1) to generate corresponding encoded and encrypted data (E2), in accordance with another embodiment of the present disclosure.

FIG. 4 is a schematic illustration of a flow chart depicting steps of a third integrated method of encoding and encrypting input data (D1), including a plurality of data blocks and/or data packets, to generate corresponding encoded and encrypted data (E2), in accordance with another embodiment of the present disclosure. Description of the steps of the first integrated method depicted in FIG. 2 pertains mutatis mutandis to the steps of the third integrated method depicted in FIG. 4, except where stated otherwise. Specifically, the description of the steps 202, 204, 206, 208, 210, 212, 216, 218, 220 and 224 pertains mutatis mutandis to steps 402, 404, 406, 408, 410, 412, 416, 418, 420 and 424, respectively.

A step 414 differs from the step 214 in that the first seed value is used alone, namely without the at least one key, for encrypting the next encoded data block and/or data packet. Likewise, a step 422 differs from the step 222 in that the next seed value is used alone for encrypting the subsequent encoded data block and/or data packet. Thus, in the third integrated method, the data processing arrangement of the encoder 110 is operable to use the at least one key for encrypting the first encoded data block and/or data packet at the step 406 alone.

Embodiments of the present disclosure provide a computer program product comprising a non-transitory (namely non-transient) computer-readable storage medium having computer-readable instructions stored thereon, the computer-readable instructions being executable by a computerized device comprising processing hardware to execute the third integrated method as described in conjunction with FIG. 4. The computer-readable instructions are optionally downloadable from a software application store, for example, from an "App store" to the computerized device.

Figure 5:
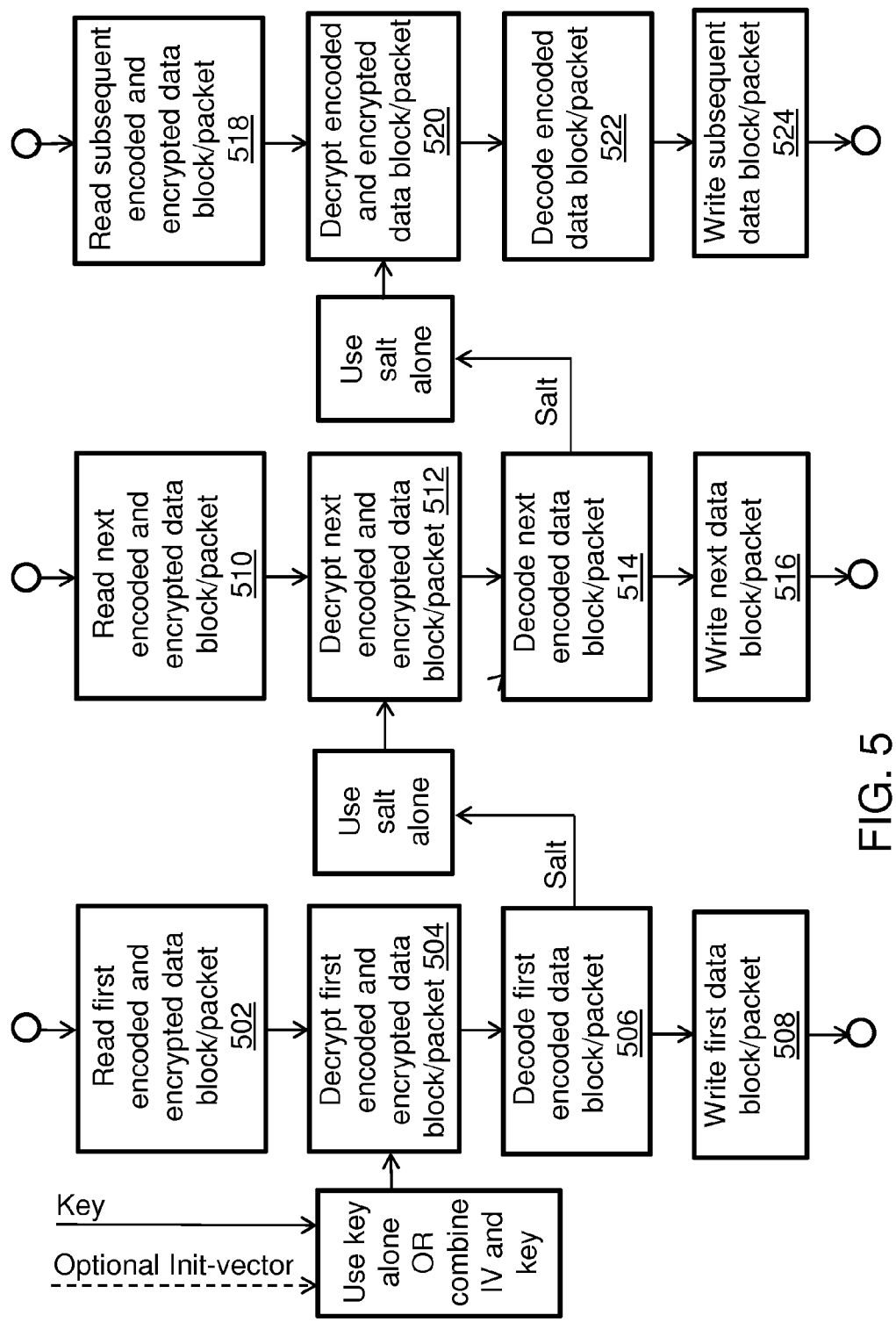
FIG. 5 is a schematic illustration of a flow chart depicting steps of a fourth integrated method of decrypting and decoding encoded and encrypted data (E2) to generate corresponding decoded data (D3), in accordance with another embodiment of the present disclosure.

FIG. 5 is a schematic illustration of a flow chart depicting steps of a fourth integrated method of decrypting and decoding encoded and encrypted data (E2), including a plurality of encoded and encrypted data blocks and/or data packets, to generate corresponding decoded data (D3), in accordance with another embodiment of the present disclosure. Description of the steps of the second integrated method depicted in FIG. 3 pertains mutatis mutandis to the steps of the fourth integrated method depicted in FIG. 5, except where stated otherwise. Specifically, the description of the steps 302, 304, 306, 308, 310, 314, 316, 318, 322 and 324 pertains mutatis mutandis to steps 502, 504, 506, 508, 510, 514, 516, 518, 522 and 524, respectively.

A step 512 differs from the step 312 in that the first seed value is used alone, namely without the at least one key, for decrypting the next encoded and encrypted data block and/or data packet. Likewise, a step 520 differs from the step 320 in that the next seed value is used alone for decrypting the subsequent encoded and encrypted data block and/or data packet. Thus, in the fourth integrated method, the data processing arrangement of the decoder 120 is operable to use the at least one key for decrypting the first encoded and encrypted data block and/or data packet at the step 504 alone.

Embodiments of the present disclosure provide a computer program product comprising a non-transitory (namely non-transient) computer-readable storage medium having computer-readable instructions stored thereon, the computer-readable instructions being executable by a computerized device comprising processing hardware to execute the fourth integrated method as described in conjunction with FIG. 5. The computer-readable instructions are optionally downloadable from a software application store, for example, from an "App store" to the computerized device.

The aforementioned first or third integrated methods are suitable for implementation into an encoder, or into a pre-processor associated with an encoder; for example, the aforementioned first or third integrated methods are suitable for use in conjunction with an existing known encryption method and complementary thereto. Similarly, the aforementioned second and fourth integrated methods are suitable for implementation into a decoder or into a pre-processor associated with a decoder; for example, the aforementioned first or third integrated methods are suitable for use in conjunction with an existing known decryption method and complementary thereto. The aforementioned methods can be implemented in software and/or via use of a hardwired logic, for example Application Specific Integrated Circuits (ASIC's). It is well known that many systems have a dedicated microchip for encryption, for example contemporary AES, that implements the encryption efficiently, while using less power than a pure software approach. The aforementioned methods make it possible to achieve considerable power and energy savings, when compared to prior art approaches of using encryption with a corresponding strength against third-party attacks, for example against spyware.

Embodiments of the present disclosure facilitate a considerable protection improvement as compared with protection achieved with prior art methods using corresponding encryption algorithms. The methods pursuant to embodiments of the present disclosure can be implemented with any suitable encoding solution, irrespective of which encryption algorithm is used. In doing so, the aforementioned methods do not alter a behavior of an integrated encryption algorithm, which means that the protection provided by the integrated encryption algorithm is not compromised. Thus, the methods pursuant to embodiments of the present disclosure strengthen further the prior art data compression and encryption algorithms by integrating them together to function in concert.

The methods pursuant to embodiments of the present disclosure are suitable for efficient utilization especially in medical or military purposes to protect vital information that is confidential or classified.

Moreover, the aforementioned methods can be implemented in connection with common, well-known open source or proprietary data compression software applications, such as 7-Zip or Win-Zip, and so forth ("7-Zip" and "Win-Zip" are proprietary trademarks).

Moreover, the integration of the encoding and encrypting processes offers an efficient model for multiprocessing, or running several processes in a parallel manner. The integration enables implementation of an optimal processing structure for a given Central Processing Unit (CPU) and a given Graphical Processing Unit (GPU) according to an available computing capacity. Thus, the aforementioned methods enable efficient threading of the integrated encryption process in the encoding process, when data blocks and/or data packets of the input data (D1) are optimized to a format that is optimal for the CPU and the GPU of a system and/or platform in which the encoding process is being run. Aforementioned branching during encryption and decryption enable parallel processing approaches to be employed, for example by allocating a dedicated data processing to each branch. Use of computing hardware such as digital array processors (DAP's) for high-speed data encryption and corresponding decryption of data thereby becomes feasible.

The aforementioned methods make it possible to use a very fast, yet efficient encryption algorithm. In this regard, the aforementioned methods use an encryption algorithm efficiently, without interfering with an inner operation of the encryption algorithm itself. Examples of encryption algorithms that are suitable for implementation with the aforementioned methods include, but are not limited to, AES, Twofish, Blowfish, Data Encryption Standard (DES), Triple DES (3-DES), Serpent, International Data Encryption Algorithm (IDEA), MARS, Rivest Cipher 6 (RC6), Camellia, CAST-128, Skipjack, eXtended Tiny Encryption Algorithm (XTEA), and so forth (these example names include registered trademarks).

Moreover, an additional advantage of integrating the encryption process with the encoding process is that the encoded and encrypted data (E2) so produced is not required to be transferred over networks with a protected, secure network connection, for example employing Virtual Private Network (VPN) tunneling, Secure Shell (SSH), or SSL/TLS protocols. Therefore, the aforementioned methods offer an advantageous model for transmitting text, binary, audio, image, video and other types of data, for example, in public Internet networks or in web services and cloud services.

Embodiments of the present disclosure are susceptible to being employed in a wide range of systems and devices, for example, such as smart telephones, Personal Computers (PC's), audio-visual apparatus, cameras, communication networks, data storage devices, surveillance systems, video conferencing systems, medical apparatus, seismic apparatus, surveying apparatus, "black box" flight recorders, digital musical instruments using sampling techniques, but not limited thereto.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

I claim:

1. An encoder for encoding and encrypting input data (D1) including a plurality of data blocks or data packets or data streams, wherein the encoder includes a data processing arrangement for processing the input data (D1) to generate corresponding encoded and encrypted data (E2), wherein the data processing arrangement integrates encoding and encrypting processes for generating the encoded and encrypted data (E2), wherein:
   (i) the data processing arrangement is configured to encode a first data block or data packet or data stream of the plurality of data blocks or data packets or data streams to generate a first encoded data block or data packet or data stream, and to encrypt the first encoded data block or data packet or data stream using at least one key to provide a first encoded and encrypted data block or data packet or data stream for inclusion in the corresponding encoded and encrypted data (E2);
   (ii) the data processing arrangement is configured to generate a first seed value wherein the first seed value is based on the first encoded data block or data packet or data stream;
   (iii) the data processing arrangement is configured to encrypt a next encoded data block or data packet or data stream to provide a next encoded and encrypted data block or data packet or data stream for inclusion in the corresponding encoded and encrypted data (E2), wherein the first seed value is used to encrypt the next encoded data block or data packet or data stream;

(iv) the data processing arrangement is configured to generate a next seed value wherein the next seed value is based on a previously encoded data block or data packet or data stream; and (v) the data processing arrangement is configured to encrypt a subsequent encoded data block or data packet or data stream in a sequential repetitive manner until the plurality of data blocks or data packets or data streams are encoded and encrypted into the corresponding encoded and encrypted data (E2), wherein the next seed value is used to encrypt the subsequent encoded data block or data packet or data stream, wherein for a given data block or data packet or data stream to be encoded and encrypted, a seed value is generated based on its previous data block or data packet or data stream.

2. The encoder as claimed in claim 1, wherein the data processing arrangement is supplied in operation with the at least one key for use in generating the corresponding encoded and encrypted data (E2).

3. The encoder as claimed in claim 1, wherein the data processing arrangement is configured to use the at least one key repetitively in combination with seed values for encrypting encoded data blocks or data packets or data streams for inclusion in the corresponding encoded and encrypted data (E2).

4. The encoder as claimed in claim 1, wherein the data processing arrangement is configured to use the at least one key for encrypting the first encoded data block or data packet or data stream alone.

5. The encoder as claimed in claim 1, wherein the data processing arrangement is configured to employ an initialization vector (IV) in combination with the at least one key when encrypting the first encoded data block or data packet or data stream.

6. The encoder as claimed in claim 1, wherein the data processing arrangement is configured to include in the corresponding encoded and encrypted data (E2) information indicative of at least one algorithm employed for generating seed values for use in encrypting the encoded data blocks or data packets or data streams.

7. The encoder as claimed in claim 1, wherein the data processing arrangement is configured to encode and encrypt the input data (D1) to generate the corresponding encoded and encrypted data (E2) in the sequential repetitive manner by branching to a plurality of concurrent sequences of encoding and encrypting of data blocks or data packets or data streams using associated seed values.

8. The encoder as claimed in claim 1, wherein the data processing arrangement is configured to encode and encrypt the input data (D1) provided in a form of at least one of: multi-dimensional data, text data, sensor data, image data, video data.

9. The encoder as claimed in claim 1, wherein the data processing arrangement is configured to arrange for delivery of the at least one key from the encoder for use in subsequent decrypting and decoding of the corresponding encoded and encrypted data (E2) manually or via an encrypted e-mail or via an encrypted communication connection.

10. The encoder as claimed in claim 9, wherein the encrypted communication connection is implemented via Secure Sockets Layer (SSL)/Transport Layer Security (TLS) protocol.

11. The encoder as claimed in claim 1, wherein the data processing arrangement is implemented by employing at least one Reduced Instruction Set Computing (RISC) processor that is configured to execute program instructions.

12. A method of encoding and encrypting input data (D1) including a plurality of data blocks or data packets or data streams via an encoder, wherein the encoder includes a data processing arrangement for processing the input data (D1) to generate corresponding encoded and encrypted data (E2), wherein the data processing arrangement integrates encoding and encrypting processes for generating the corresponding encoded and encrypted data (E2), and wherein the method comprises:

(i) encoding a first data block or data packet or data stream of the plurality of data blocks or data packets or data streams to generate a first encoded data block or data packet or data stream;

(ii) encrypting the first encoded data block or data packet or data stream using at least one key to provide a first encoded and encrypted data block or data packet or data stream for inclusion in the corresponding encoded and encrypted data (E2);

(iii) generating a first seed value wherein the first seed value is based on the first encoded data block or data packet or data stream;

(iv) encrypting a next encoded data block or data packet or data stream to provide a next encoded and encrypted data block or data packet or data stream for inclusion in the corresponding encoded and encrypted data (E2), wherein the first seed value is used to encrypt the next encoded data block or data packet or data stream;

(v) generating a next seed value wherein the next seed value is based on a previously encoded data block or data packet or data stream; and (iv) encrypting a subsequent encoded data block or data packet or data stream, in a sequential repetitive manner, until the plurality of data blocks or data packets or data streams are encoded and encrypted into the corresponding encoded and encrypted data (E2), wherein the next seed value is used to encrypt the subsequent encoded data block or data packet or data stream, wherein for a given data block or data packet or data stream to be encoded and encrypted, a seed value is generated based on its previous data block or data packet or data stream.

13. A decoder for decrypting and decoding encoded and encrypted data (E2) including a plurality of encoded and encrypted data blocks or data packets or data streams, wherein the decoder includes a data processing arrangement for processing the encoded and encrypted data (E2) to generate corresponding decoded data (D3), and wherein the decoder is supplied in operation with at least one key for use in generating the corresponding decoded data (D3), wherein the data processing arrangement integrates decoding and decrypting processes for generating the corresponding decoded data (D3), wherein:

(i) the data processing arrangement is configured to decrypt a first encoded and encrypted data block or data packet or data stream of the plurality of encoded and encrypted data blocks or data packets or data streams using the at least one key to generate a first decrypted encoded data block or data packet or data stream, and to decode the first decrypted encoded data block or data packet or data stream to provide a first decrypted and decoded data block or data packet or data stream for inclusion in the corresponding decoded data (D3);

(ii) the data processing arrangement is configured to generate a first seed value wherein the first seed value is based on the first decrypted and decoded data block or data packet or data stream;

(iii) the data processing arrangement is configured to decrypt a next encoded and encrypted data block or data packet or data stream of the plurality of encoded and encrypted data blocks or data packets or data streams to generate a next decrypted and encoded data block or data packet or data stream, and to decode the next encoded data block or data packet or data stream to provide a next decrypted and decoded data block or data packet or data stream for inclusion in the corresponding decoded data (D3), wherein the first seed value is used to decrypt the next encoded and encrypted data block or data packet or data stream;

(iv) the data processing arrangement is configured to generate a next seed value wherein the next seed value is based on a previous decrypted and decoded data block or data packet or data stream; and (v) the data processing arrangement is configured to decrypt and decode a subsequent encoded and encrypted data block or data packet or data stream of the plurality of encoded and encrypted data blocks or data packets or data streams in a sequential repetitive manner until the plurality of encoded and encrypted data blocks or data packets or data streams are decrypted and decoded into the corresponding decoded data (D3), wherein the next seed value is used to decrypt the subsequent encoded and encrypted data block or data packet or data stream, wherein for a given encoded and encrypted data block or data packet or data stream to be decrypted and decoded, a seed value is generated based on its previous decrypted and decoded data block or data packet or data stream.

14. The decoder as claimed in claim 13, wherein the data processing arrangement is configured to use the at least one key repetitively in combination with seed values for decrypting the plurality of encoded and encrypted data blocks or data packets or data streams.

15. The decoder as claimed in claim 13, wherein the data processing arrangement is configured to use the at least one key for decrypting the first encoded and encrypted data block or data packet or data stream alone.

16. The decoder as claimed in claim 13, wherein the data processing arrangement is configured to employ an initialization vector (IV) in combination with the at least one key when decrypting the first encoded and encrypted data block or data packet or data stream.

17. The decoder as claimed in claim 13, wherein the data processing arrangement is configured to decrypt and decode the encoded and encrypted data (E2) to generate the corresponding decoded data (D3) in the sequential repetitive manner by branching to a plurality of concurrent sequences of decrypting and decoding of encoded and encrypted data blocks or data packets or data streams using associated seed values.

18. The decoder as claimed in claim 13, wherein the data processing arrangement is configured to decrypt and decode the encoded and encrypted data (E2) provided in a form of at least one of: encoded and encrypted multi-dimensional data, encoded and encrypted text data, encoded and encrypted sensor data, encoded and encrypted image data, encoded and encrypted video data.

19. The decoder as claimed in claim 13, wherein the data processing arrangement is configured to arrange for receiving the at least one key at the decoder, for use in subsequent decrypting and decoding of the encoded and encrypted data (E2) by one or more of manually, via an encrypted e-mail or via an encrypted communication connection.

20. The decoder as claimed in claim 13, wherein the encrypted communication connection is implemented via Secure Sockets Layer (SSL)/Transport Layer Security (TLS) protocol.

21. The decoder as claimed in claim 13, wherein the data processing arrangement is implemented by employing at least one Reduced Instruction Set Computing (RISC) processor that is configured to execute program instructions.

22. A method of decrypting and decoding encoded and encrypted data (E2) including a plurality of encoded and encrypted data blocks or data packets or data streams, via a decoder, wherein the decoder includes a data processing arrangement for processing the encoded and encrypted data (E2) to generate corresponding decoded data (D3), and wherein the decoder is supplied in operation with at least one key for use in generating the corresponding decoded data (D3), wherein that the data processing arrangement integrates decoding and decrypting processes for generating the corresponding decoded data (D3), wherein the method comprises:

(i) decrypting at least a first encoded and encrypted data block or data packet or data stream of the plurality of encoded and encrypted data blocks or data packets or data streams using the at least one key to generate a first decrypted and encoded data block or data packet or data stream;

(ii) decoding the first encoded data block or data packet or data stream to provide a first decrypted and decoded data block or data packet or data stream for inclusion in the decoded data (D3);

(iii) generating a first seed value wherein the first seed value is based on the first decrypted and decoded data block or data packet or data stream;

(iv) decrypting and decoding a next encoded and encrypted data block or data packet or data stream of the plurality of encoded and encrypted data blocks or data packets or data streams to provide a next decrypted and decoded data block or data packet or data stream for inclusion in the corresponding decoded data (D3), wherein the first seed value is used to decrypt the next encoded and encrypted data block or data packet or data stream;

(v) generating a next seed value wherein the next seed value is based on a previous decrypted and decoded data block or data packet or data stream; and (vi) decrypting and decoding a subsequent encoded and encrypted data block or data packet or data stream of the plurality of encoded and encrypted data blocks or data packets or data streams in a sequential repetitive manner until the plurality of encoded and encrypted data blocks or data packets or data streams are decrypted and decoded into the corresponding decoded data (D3), wherein the next seed value is used to decrypt the subsequent encoded and encrypted data block or data packet or data stream, wherein for a given encoded and encrypted data block or data packet or data stream to be decrypted and decoded, a seed value is generated based on its previous decrypted and decoded data block or data packet or data stream.

23. A codec comprising:

an encoder for encoding and encrypting input data (DI) including a plurality of data blocks or data packets or data streams, wherein the encoder includes a data processing arrangement for processing the input data (DI) to generate corresponding encoded and encrypted data (E2), wherein the data processing arrangement integrates encoding and encrypting processes for generating the corresponding encoded and encrypted data (E2), wherein:
(i) the data processing arrangement is configured to encode a first data block or data packet or data stream of the plurality of data blocks or data packets or data streams to generate a first encoded data block or data packet or data stream, and to encrypt the first encoded data block or data packet or data stream using at least one key to provide a first encoded and encrypted data block or data packet or data stream for inclusion in the corresponding encoded and encrypted data (E2);
(ii) the data processing arrangement is configured to generate a first seed value wherein the first seed value is based on the first encoded data block or data packet or data stream;
(iii) the data processing arrangement is configured to encrypt a next encoded data block or data packet or data stream to provide a next encoded and encrypted data block or data packet or data stream for inclusion in the corresponding encoded and encrypted data (E2), wherein the first seed value is used to encrypt the next encoded data block or data packet or data stream;
(iv) the data processing arrangement is configured to generate a next seed value wherein the next seed value is based on a previously encoded data block or data packet or data stream; and
(v) the data processing arrangement is configured to encrypt a subsequent encoded data block or data packet or data stream in a sequential repetitive manner until the plurality of data blocks or data packets or data streams are encoded and encrypted into the corresponding encoded and encrypted data (E2), wherein the next seed value is used to encrypt the subsequent encoded data block or data packet or data stream,
wherein for a given data block or data packet or data stream to be encoded and encrypted, a seed value is generated based on its previous data block or data packet or data stream, and
a decoder for decrypting and decoding the corresponding encoded and encrypted data (E2) including a plurality of encoded and encrypted data blocks or data packets or data streams, wherein the decoder includes a data processing arrangement for processing the corresponding encoded and encrypted data (E2) to generate corresponding decoded data (D3), and wherein the decoder is supplied in operation with at least one key for use in generating the corresponding decoded data (D3), wherein the data processing arrangement integrates decoding and decrypting processes for generating the corresponding decoded data (D3), wherein:
(i) the data processing arrangement is configured to decrypt at least a first encoded and encrypted data block or data packet or data stream of the plurality of encoded and encrypted data blocks or data packets or data streams using the at least one key to generate at least a first decrypted encoded data block or data packet or data stream, and to decode the at least first decrypted encoded data block or data packet or data stream to provide at least a first decrypted and decoded data block or data packet or data stream for inclusion in the corresponding decoded data (D3);
(ii) the data processing arrangement is configured to generate a first seed value wherein the first seed value is based on the at least a first decrypted and decoded data block or data packet or data stream;
(iii) the data processing arrangement is configured to decrypt a next encoded and encrypted data block or data packet or data stream of the plurality of encoded and encrypted data blocks or data packets or data streams to generate a next decrypted encoded data block or data packet or data stream, and to decode the next decrypted encoded data block or data packet or data stream to provide a next decoded data block or data packet or data stream for inclusion in the corresponding decoded data (D3), wherein the first seed value is used to decrypt the next encoded and encrypted data block or data packet or data stream;
(iv) the data processing arrangement is configured to generate a next seed value wherein the next seed value is based on a previous decrypted and decoded data block or data packet or data stream; and
(v) the data processing arrangement is configured to decrypt and decoding a subsequent encoded and encrypted data block or data packet or data stream of the plurality of encoded and encrypted data blocks or data packets or data streams in a sequential repetitive manner until the plurality of encoded and encrypted data blocks or data packets or data streams are decrypted and decoded into the corresponding decoded data (D3), wherein the next seed value is used to decrypt the subsequent encoded and encrypted data block or data packet or data stream,
wherein for a given encoded and encrypted data block or data packet or data stream to be decrypted and decoded, a seed value is generated based on its previous decrypted and decoded data block or data packet or data stream.

* * * * *